(12) United States Patent
McClung, III

(10) Patent No.: US 8,973,656 B2
(45) Date of Patent: Mar. 10, 2015

(54) WELLBORE OPERATIONS, SYSTEMS, AND METHODS WITH MCNANO DEVICES

(76) Inventor: Guy L. McClung, III, Rockport, TX (US)

( * ) Notice: Subject to any disclaimer, the term of this patent is extended or adjusted under 35 U.S.C. 154(b) by 669 days.

(21) Appl. No.: 13/373,283

(22) Filed: Nov. 9, 2011

(65) Prior Publication Data
US 2012/0132418 A1    May 31, 2012

Related U.S. Application Data

(60) Provisional application No. 61/458,444, filed on Nov. 22, 2010.

(51) Int. Cl.
*E21B 47/10* (2012.01)
*B82Y 15/00* (2011.01)
*E21B 47/12* (2012.01)

(52) U.S. Cl.
CPC ............... *B82Y 15/00* (2013.01); *E21B 47/122* (2013.01); *E21B 47/124* (2013.01)
USPC ........................................ 166/250.12; 175/40

(58) Field of Classification Search
CPC ........... E21B 44/00; E21B 47/00; E21B 7/00; E21B 47/12; E21B 47/1015
USPC ............................ 166/250.12, 250.11; 175/40
See application file for complete search history.

(56) References Cited

U.S. PATENT DOCUMENTS

| | | | |
|---|---|---|---|
| 6,250,984 B1 | 6/2001 | Jin et al. | 445/51 |
| 6,510,947 B1 | 1/2003 | Schulte et al. | 210/383 |
| 6,762,237 B2 | 7/2004 | Glatkowski et al. | 524/496 |
| 7,074,310 B2 | 7/2006 | Smalley et al. | 204/450 |
| 7,589,342 B2 | 9/2009 | Chang | 257/3 |
| 7,629,604 B2 | 12/2009 | Veneruso et al. | 257/29 |
| 7,874,250 B2 | 1/2011 | Veneruso | 102/322 |
| 7,921,384 B2 | 4/2011 | Solomon | 716/30 |
| 8,020,621 B2 | 9/2011 | DiFoggio et al. | 166/302 |
| 2004/0045721 A1* | 3/2004 | Shiyou | 166/385 |
| 2009/0027280 A1 | 1/2009 | Frangioni et al. | 343/703 |
| 2009/0219019 A1 | 9/2009 | Taherian et al. | 324/303 |
| 2009/0301778 A1 | 12/2009 | Taylor | 175/40 |
| 2010/0102986 A1 | 4/2010 | Benischek et al. | 340/855.8 |
| 2010/0140473 A1 | 6/2010 | Klocke | 250/309 |
| 2010/0268470 A1 | 10/2010 | Kamal et al. | 702/13 |
| 2011/0111988 A1 | 5/2011 | Ionescu Vasii et al. | 507/103 |
| 2012/0048538 A1* | 3/2012 | Brannon | 166/250.01 |

* cited by examiner

*Primary Examiner* — David Andrews
*Assistant Examiner* — Wei Wang
(74) *Attorney, Agent, or Firm* — Guy McClung

(57) ABSTRACT

Systems and methods for using very small devices, "McNano devices," to facilitate and enhance operations in the oilpatch. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

14 Claims, 13 Drawing Sheets

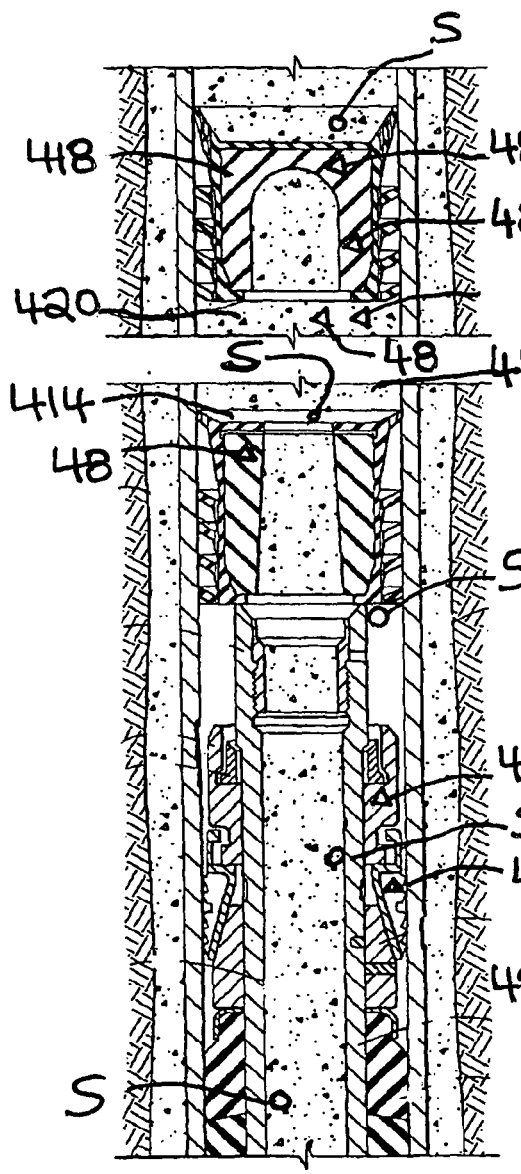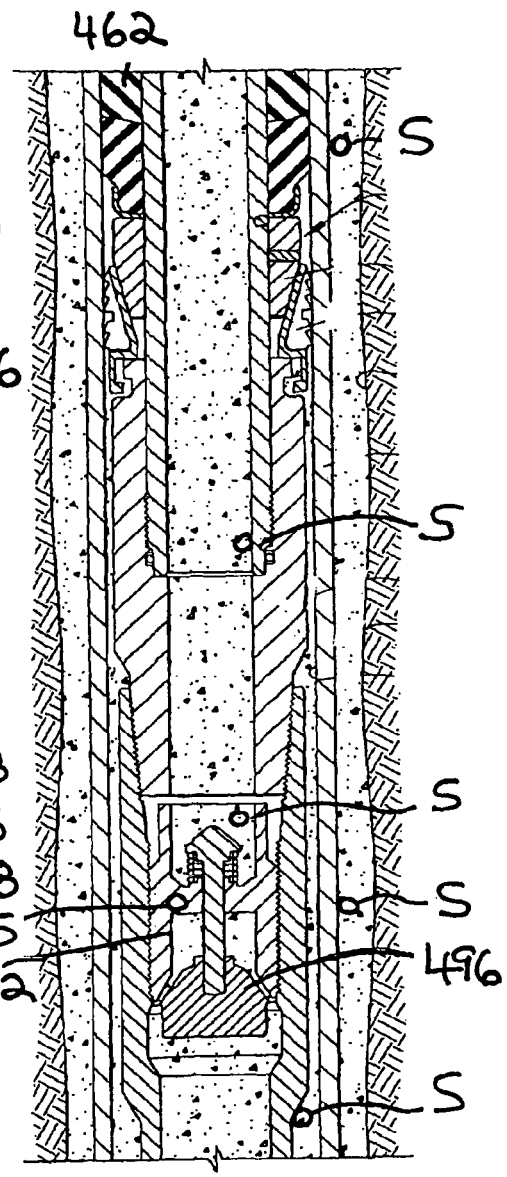
Fig. 4D
Fig. 4E

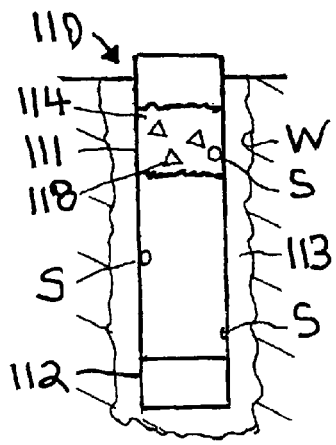
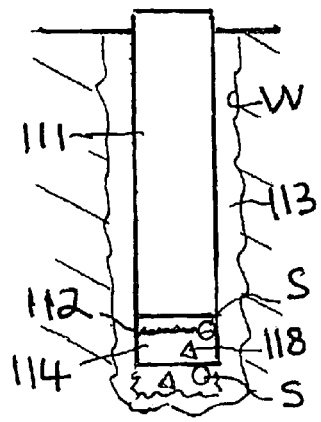
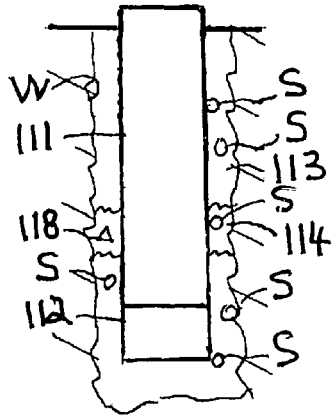
Fig. 11 A     Fig. 11 B     Fig. 11 C
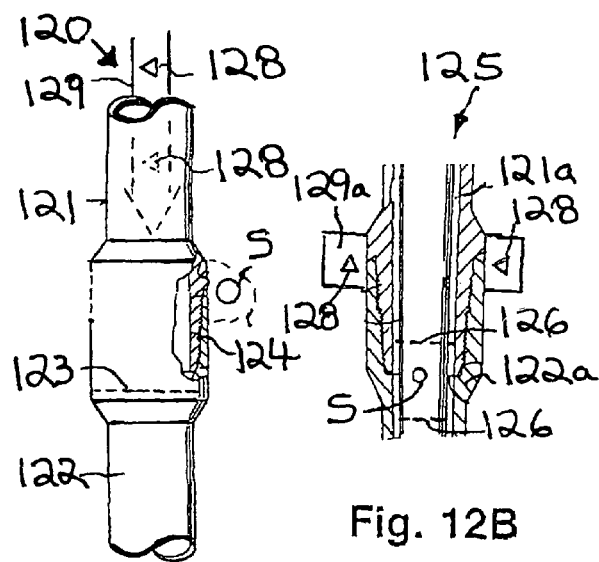
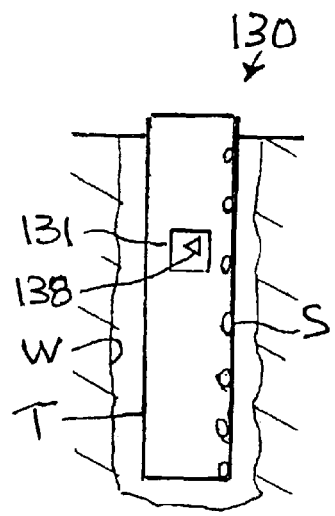
Fig. 12A     Fig. 12B     Fig. 13

Fig. 18
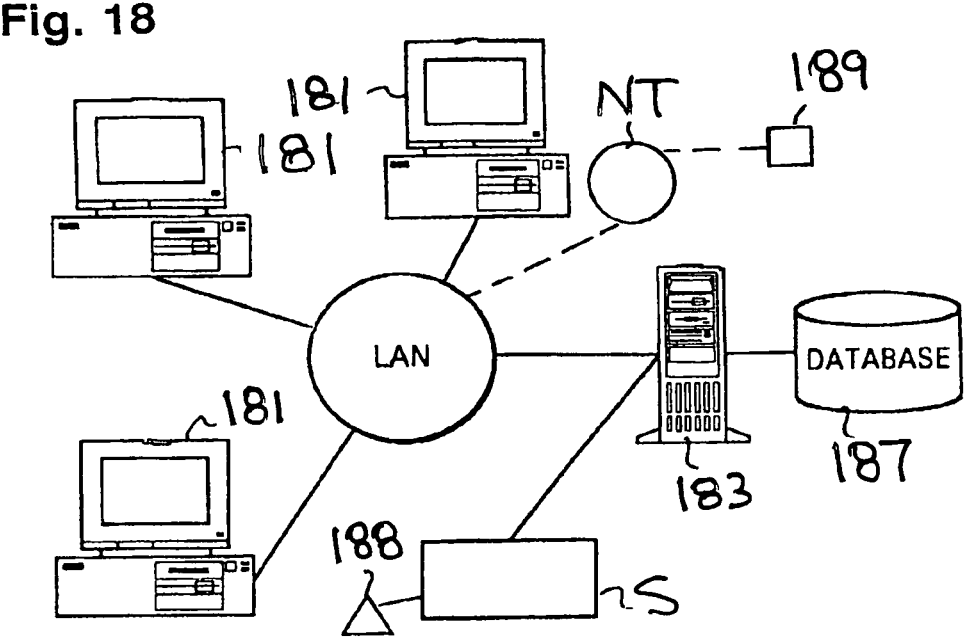
Fig. 19A
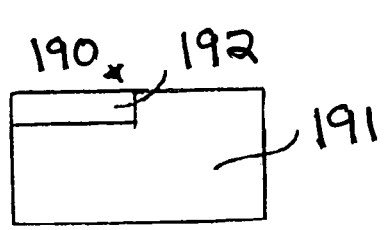
Fig. 19B
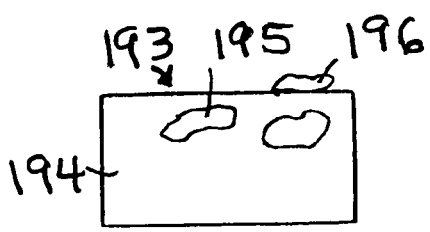
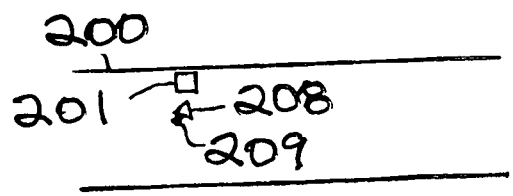
Fig. 20

WELLBORE OPERATIONS, SYSTEMS, AND METHODS WITH MCNANO DEVICES

RELATED APPLICATION

The present invention and application claim the benefit of priority under the U.S. Patent Laws of U.S. application Ser. No. 61/458,444 filed Nov. 22, 2010, which application is incorporated fully herein for all purposes.

BACKGROUND OF THE INVENTION

1. Field of the Invention

The present invention is directed to rig operations and to wellbore operations, systems and methods with very small devices such as microdevices, nanodevices, micro-resonant devices, nanotransmitters, nanorobots, and nano RFID devices (all referred to herein as "McNano devices") and, in at least certain embodiments, to such operations, systems and methods using McNano devices in association with rig or wellbore equipment, drilling equipment, completion operations, completion equipment, fluid movement apparatuses, fluid processing systems, solids control systems, and fluid conduits and wellbores; and to such systems and methods useful in well drilling, control and production.

2. Description of Related Art

A variety of nano RFID devices are known, see, e.g., U.S. patent application Ser. No. 12/501,909 filed Jul. 13, 2009, Ser. No. 12/498,689 filed Jul. 7, 2009; and Ser. No. 12/497,193 filed Jul. 2, 2009—all of which are incorporated fully herein for all purposes.

A variety of micro-resonant devices are known, see, e.g., U.S. patent application Ser. No. 11/913,661 published Jan. 29, 2009, Pub. No. 2009/0027280 A1, incorporated fully herein for all purposes.

A variety of nanodevices including nanorobots are known, see, e.g., U.S. patent application Ser. No. 12/604,310 filed Oct. 22, 2009 which is incorporated fully herein for all purposes. As defined below, for purposes of this invention and this application, "McNano devices includes, inter alia, the devices disclosed referred to in, and disclosed in references cited in the five patent applications referred to above.

BRIEF SUMMARY OF THE INVENTION

The present invention, in certain aspects, discloses systems, equipment, and methods in which very small devices, including microdevices, nanodevices, nanorobots, micro-resonant devices ("MRDs"), nanotransmitters, and/or nano RFID devices ("nano RFIDs" or "nanotags"). Such very small devices are referred to herein collectively as "McNano" devices or "McNanos". McNano device are used, according to the present invention, in a variety of operations and with a variety of equipment. In certain embodiments, at least one, one, or a plurality of such McNano device are used in equipment, systems, and operations in the oil and gas industries, e.g. in rig operations, well formation, well completion, well production, fluid processing, solids control, and testing methods and with equipment used in these methods. In certain aspects, the McNano device(s) are coated, sheathed, or layered with protective and/or strengthening material, e.g., but not limited to plastic, metal, polytetrafluoroethylene, and/or ballistic material to cope with a wellbore environment (e.g. but not limited to, environments of extreme temperature or environments of corrosive or caustic materials or fluids) in which a McNano device is used (and this can be true for an McNano device disclosed herein and any such device described below on any method according to the present invention).

Certain McNano devices used in equipment and methods according to the present invention are those disclosed in U.S. Pub. No. 2009/0027280 and are small micro-resonant devices (MRDs) that can receive an excitation signal and generates and transmit an emission signal, and can be tracked in an oil and gas industry method or environment, e.g., devices that are on the order of about 5 to 100 microns in diameter or up to about 1000 microns or much smaller, down to about 5 nanometers.

McNano devices can include monolithic MRDs that include an antenna component that receives an excitation signal and transmits an emission signal; and a resonator component that receives an excitation signal and generates a corresponding emission signal; and, optionally an outer coating that envelopes the device and isolates the device from its environment; and which coating, in certain aspects according to the present invention, specifically protect a device from fluids and materials encountered in oil and gas operations, within equipment used in such operations, and within oil and gas wells. These devices can have an overall diameter of less than about 1000 microns, e.g., 100 or 10 microns, and a Q value of greater than about 5, e.g., greater than 10, 50, 100, or much higher, and the emission signal can be (i) a resonant frequency of the device emitted at a delayed time compared to the excitation signal (or at a time after the excitation signal has stopped), (ii) a frequency different than the excitation signal; (iii) a signal at a different polarization than the excitation signal, or (iv) a resonant frequency of the device which upon excitation by an excitation field (e.g., a magnetic field), distorts the applied excitation field.

In such McNano devices, the antenna component and the resonator component can be the same component, i.e., one component that functions as both an antenna and as a resonator. The devices can also be designed such that the resonant frequency is proportional to an applied magnetic field, e.g., by fabricating the resonator of a magnetic metal or alloy to induce magnetic field dependence to the resonant frequency.

In certain embodiments, the invention features McNano devices which are MRDS as in U.S. Pub. No. 2009/0027280 in the form of cylindrical or prismatic length extender bars that include a transducer material, e.g., a piezoelectric or magnetostrictive transducer material, and that have a length of less than about 100 microns and a diameter of less than about 100 microns; and optionally an outer coating that envelopes the device and isolates the device from its environment in a well or in equipment used in oil and gas operations. In certain aspects, these McNanos can resonate at a resonant frequency of greater than about 50 MHz after receiving an excitation signal at the reonant frequency.

An outer layer for such McNano devices can include a hydrophilic material encompassing the device or a hydrophobic material encompassing the device and/or a protective sheath, layer, or coating.

In other embodiments, the McNano devices are in the form of devices that include a hermetically-sealed housing having walls forming an internal chamber; a cantilever arranged within the internal chamber and having a free end and a fixed end connected to a wall of the housing; and an electrode arranged within the internal chamber in parallel and spaced from the cantilever; wherein, in certain aspects, the overall size of the device is no larger than about 1000 microns, e.g., no larger than 100 or 10 microns.

In certain aspects, in a well, near a well, and/or in or near equipment used in well operations, McNano devices are located and/or tracked (e.g. by an "apparatus S") by generating an excitation signal randomly at any location at which they appear or in a target area in which the device might be located; receiving an emission signal from the one or more McNanos, if any, e.g., in a target area; and processing the emission signal to determine the location of the device(s). In various methods, the McNano devices can have an overall diameter or largest dimension of about 10 microns or less. In embodiments in which the emission signal is a resonant frequency of the device, the device can further include a magnetic material to induce magnetic field dependence to the resonant frequency, and the methods can further include exposing the device or the device in a target area to a magnetic field.

In certain methods according to the present invention, a target area can be within a well, within a tubular, within cement, and/or within equipment, and the emission signal can be any suitable frequency. McNano devices can be attached to an object, and then used to track the object within a well, within and/or through a piece of equipment, and/or within a target area.

McNano devices may have an overall outer diameter or largest dimension of less than about 1000 microns, and can be much smaller, e.g., less than 500, 250, 100, 50, 20, 10, 5, or 1 micron, or even on the nanometer scale, e.g., 500, 250, 200, 100, 50, 25, 10, or 5 nanometers. McNanos can be individual, standalone, monolithic devices, or can be made of a set of or a plurality of McNanos, e.g. nano-resonant devices, that are each on the nanoscale, e.g., in certain aspects, about 500 nanometers or less, e.g., less than 250, 100, 50, 25, 10, or 5 nanometers in size.

The McNano devices can either (i) individually produce a resonant signal, e.g. when detected, or when acting in concert in a particular target location, or a set of McNano devices can produce a collective signal of sufficient power to be detected in the same way that a signal from one device is detected, or (ii) individually do not produce a signal, but assemble, e.g., self-assemble, at a location or at a target location to form a McNano device, e.g. micro-resonant device, to produce a detectable signal or collectively act to produce a detectable signal. Once congregated or self-assembled at a location or at a target location, a set of McNano devices can act like a single device. Alternatively, the McNano devices can each individually produce a detectable signal.

The McNano devices can be designed and fabricated so that their resonant frequency is sensitive to their surrounding temperature, chemistry, pH, thus making them useful as local sensors with detectable readout (e.g. RF readout). McNano devices with metal or with metallic layers can be detected by conventional metal detection devices and apparatuses.

The McNano device (s) can be micron-sized devices that can generate and emit signals at resonant frequencies not present (or at very low levels) in a location, a target location, or in and oil and gas well environment. In certain aspects, these individual devices, e.g., located in a target environment, can be located in three-dimensional space and tracked anywhere in the target environment using conventional methods and apparatuses. If an RF device is used, one or more can be used to locate the presence of the McNano devices and can also determine the 3-D location, e.g., by using three separate RF devices. Alternatively, one can use even a single antenna (RF device) if it is focused and rotated around the target.

In certain aspects, McNano devices are monolithic devices, i.e., they are fabricated entirely on a single silicon chip or substrate. They can also be standalone devices, in that they can operate without the need for any connection to another circuit or device. Their power requirements can be provided from an on-board power source or from detectors used to detect, track and image them. They can be detected individually, or e.g. when they are composed of a set of nano-scale McNano devices, they can be detected when congregated at a location or at a target location within a target environment or area.

In certain embodiments, McNano devices can have a coating, sheath, or layer that insulates them from a fluid, a material, or an environment. The coating can be hermetically sealed to keep its interior free from fluids, e.g., liquids and/or gases in an environment.

Certain McNano devices convert mechanical motion into an electrical signal (as in U.S. Pub. No. 2009/0027280).

A simple tracking device (e.g. an "apparatus S") for tracking McNano devices can have a single send/receive antenna that is focused to a precise point in 3-D space. To create an image of a large object, the antenna is scanned in three dimensions, e.g., in a circular, up/down, and in/out, thus probing the entire 3-D space occupied by the large object. Another device has a ring of antennae, or multiple rings of different diameter, that are scanned in one direction, e.g., up and down, to reconstruct a 3-D location of a McNano. Another device includes a large, but finite, number of antennae that reconstruct the position of Mcnano devices in 3-D space without moving.

McNanos can also sense for pH, specific chemicals, etc. encountered in an oil and gas well.

In one aspect of the invention, a McNano device is a nano radio frequency identification (RFID) device that includes a radio frequency (RF) section configured to send an RF signal and at least one antenna operatively coupled to the RF section for emitting the RF signal, and the nano RFID device is configured to be less than about 150 nanometers in each of width, length and thickness.

In another aspect, a method for using a McNano device that is nano radio frequency identification (RFID) device, the nano RFID device includes a radio frequency (RF) section configured to emit an RF signal and at least one antenna operatively coupled to the RF section to emit the signal, wherein the nano RFID device is configured to be less than about 150 nanometers in each of width, length and thickness, the method including configuring identification data within the nano RFID device that identifies the RFID device and embedding the nano RFID device within an item or composition for tracking the item or composition. Identification data can similarly be configured in other McNanos. A McNano device can be energized and/or interrogated with an RF signal.

The method and device of the invention includes, in certain aspects, providing a nano radio frequency identification (RFID) device (RFID tag) of about 150 nanometers or smaller in dimension. In some embodiments, the RFID device may include semiconductors as small as is 90 nanometers, perhaps with some chips configured and provided at the 65 nanometer, 45 nanometer and/or 30 nanometer size level. The technology for included electrical circuitry in such a McNano or in any other suitable McNano may include CMOS or related technology for low power consumption.

A McNano device for use in methods according to the present invention may include a nano RFID device with a radio frequency circuit (RF) that may be configured to respond to a received RF signal and to provide identifying information of the nano RFID device which may be associated with a composition, item, product, person, or similar object. Optionally, and as is true for any McNano device, in some applications, the nano RF circuit may provide identifying information of the device when not triggered by a received RF signal; and identifying information may be electronically encoded alphanumeric data to uniquely identify the nano-RFID device. The RF circuit may also be configured with a memory, such as, but not limited to, EEROM or EEPROM, for example, to store other information that may be transmitted along with the identifying information. The nano RFID device may also include antennae that may receive an RF signal and also emit a response signal as generated by an RF circuit. The antennae may be at least one, or two, carbon nano tubes or other nano materials suitable for RF reception and emission such as transmitting an outbound backscatter signal. As is true of any McNano device, a nano RFID device may have a protective layer, sheath, or coating such as a plastic coating, polytetrafluoroethylene coating, or other suitable composition that provides environmental protection for the nano-RFID device. The nano-RFID device may have a size of about 150 nanometers, or smaller, in all dimensions (length, width and thickness).

A McNano device that has an active nano RFID component may include an active nano RFID device and may include a radio frequency circuit (RF) that is configured to receive a RF signal and configured to emit data as initiated by the RF circuit or as initiated by a micro-circuit (e.g., a micro-processor, or the like) that provides additional processing and control capability. The emitted data may include identifying information of the active nano RFID device, which may be associated with a composition, item, product, object, person, or similar object. The identifying information may be electronically encoded alphanumeric data to uniquely identify the nano-RFID device. The active nano device may also be configured with a memory, such as EEROM or EEPROM, for example, to store the identifying data, and/or other information that may be transmitted along with the identifying information.

The McNano device may include (as is true for any Mcnano device) an active nano device and a nano power source such as a nano battery or a power generator, for example. The power source may be fabricated as a nano chemical-battery as is known in the art. The power source may be configured to provide power to an RF circuit of the device, a micro-circuit, and/or memory. The power source may provide sufficient power to cause a stronger response signal, hence greater transmission distances, as compared with a passive nano RFID. Antennae may receive an RF signal and also emit a response signal as generated by the RF circuit that may be initiated by the micro-circuit. The antennae may be at least one, or two or more, carbon nano tubes or other nano materials suitable for RF reception and emission such as transmitting outbound backscatter signal. The RF circuit and the micro-circuit may be combined in some embodiments.

In one method a McNano device in a well operation is a nano-RFID which may be provided, and initialized or configured with identifying data unique to the particular device, and/or unique to an item, composition, person or object associated with the device. This may be (as is true for any McNano device), for example, a serial number, a product code, a name, an encoded identifier, or the like. The device may be embedded in, connected to, or attached to, a composition or material, item, or product or introduced into a fluid or a flow stream. The composition etc. may be tracked and the resulting identification information received by a reception apparatus or system (e.g. an "apparatus S") and processed according to an application or system using the device.

In some applications, the identification information within a McNano device (including, but not limited to a nano RFID device) may be duplicated among more than one device, so that more than one device may have the same identification information, or at least a subset of the same information. This capability may be useful in those applications where an associated item might have multiple devices. In such a case, the identification data may be the same identifying data in all the devices in an item or object.

In certain embodiments, a McNano device may contain temperature, pressure, mechanical (e.g., harmonic) electrical, and/or chemical sensors. In one embodiment, the device may also contain a radio transmitter capable of transmitting continuous, interval, or on-demand signals. The transmitter may contain a power supply, such as a battery. Both the transmitter and power supply may be incorporated on a body or on a single chip. The apparatus may contain remotely programmable subdevices or units capable of detecting and analyzing operations and fluid parameters, e.g., but not limited to, temperature, pH, pressure, and electrical and chemical sensors according to time and location.

Related technology that may provide an expanded description of various techniques and principles herein may be found in one or more publications such as, for example: "Nanophysics and Nanotechnology: An Introduction to Modern Concepts in Nanoscience," Edward L. Wolf, Wiley-VCA; 2 edition (October 2006); "Springer Handbook of Nanotechnology," Springer, 2nd rev. and extended ed. edition (March 2007); "Introduction to Nanoscale Science and Technology (Nanostructure Science and Technology)," Springer, 1.sup.st edition (June 2004); "Fundamentals of Microfabrication: The Science of Miniaturization," Marc J. Madou, CRC, 2 edition (Mar. 13, 2002); "RFID Essentials (Theory in Practice)," O'Reilly Media, Inc. (January 2006); "RFID Applied" by Jerry Banks, David Hanny, Manuel A. Pachano, Les G. Thompson, Wiley (Mar. 30, 2007); "Carbon Nanotubes: Properties and Applications" by Michael J. O'Connell, CRC (May 2006); and "Nanoscale Science and Technology" by Robert Kelsall, Ian Hamley, Mark Geoghegan, Wiley (April 2005), all publications referred to herein are incorporated by reference in their entirety.

Accordingly, the present invention includes features and advantages which are believed to enable it to advance very small device technology and, in certain aspects, various oil and gas systems and operations technologies. Characteristics and advantages of the present invention described above and additional features and benefits will be readily apparent to those skilled in the art upon consideration of the following detailed description of preferred embodiments and referring to the accompanying drawings.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide:

New, useful unique, efficient, nonobvious methods using at least one McNano device (very small device, e.g., but not limited to, at least one micro-resonant device or at least one nano RFID device) or a plurality or combination of such devices;

New, useful unique, efficient, nonobvious equipment, apparatuses, systems, equipment, methods, machines, and/or devices for oil or gas industry operations and methods using at least one McNano device or a plurality or combination of such devices.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the long-felt needs and provides a solution to problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

BRIEF DESCRIPTION OF THE SEVERAL VIEWS OF THE DRAWING

A more particular description of embodiments of the invention briefly summarized above may be had by references to the embodiments which are shown in the drawings which form a part of this specification. These drawings illustrate embodiments preferred at the time of filing for this patent and are not to be used to Improperly limit the scope of the invention which may have other equally effective or legally equivalent embodiments.

FIG. 4D is a side cross-section schematic view of a system according to the present invention showing the float system of the present invention operating in a wellbore during cementing operations.

FIG. 4E is a side cross-section schematic view of a system according to the present invention showing the float system of the present invention operating in a wellbore during cementing operations.

FIG. 11A is a schematic view of a system according to the present invention.

FIG. 11B is a schematic view of a system according to the present invention.

FIG. 11C is a schematic view of a system according to the present invention.

FIG. 12A is a side view, partially cutaway, of a system according to the present invention.

FIG. 12B is a cross-section view of a system according to the present invention.

FIG. 13 is a schematic view of a system according to the present invention.

FIG. 18 is a schematic view of a system according to the present invention.

FIG. 19A is a schematic view of a device according to the present invention.

FIG. 19B is a schematic view of a device according to the present invention.

FIG. 20 is a schematic view of a system according to the present invention.

Figure 1:
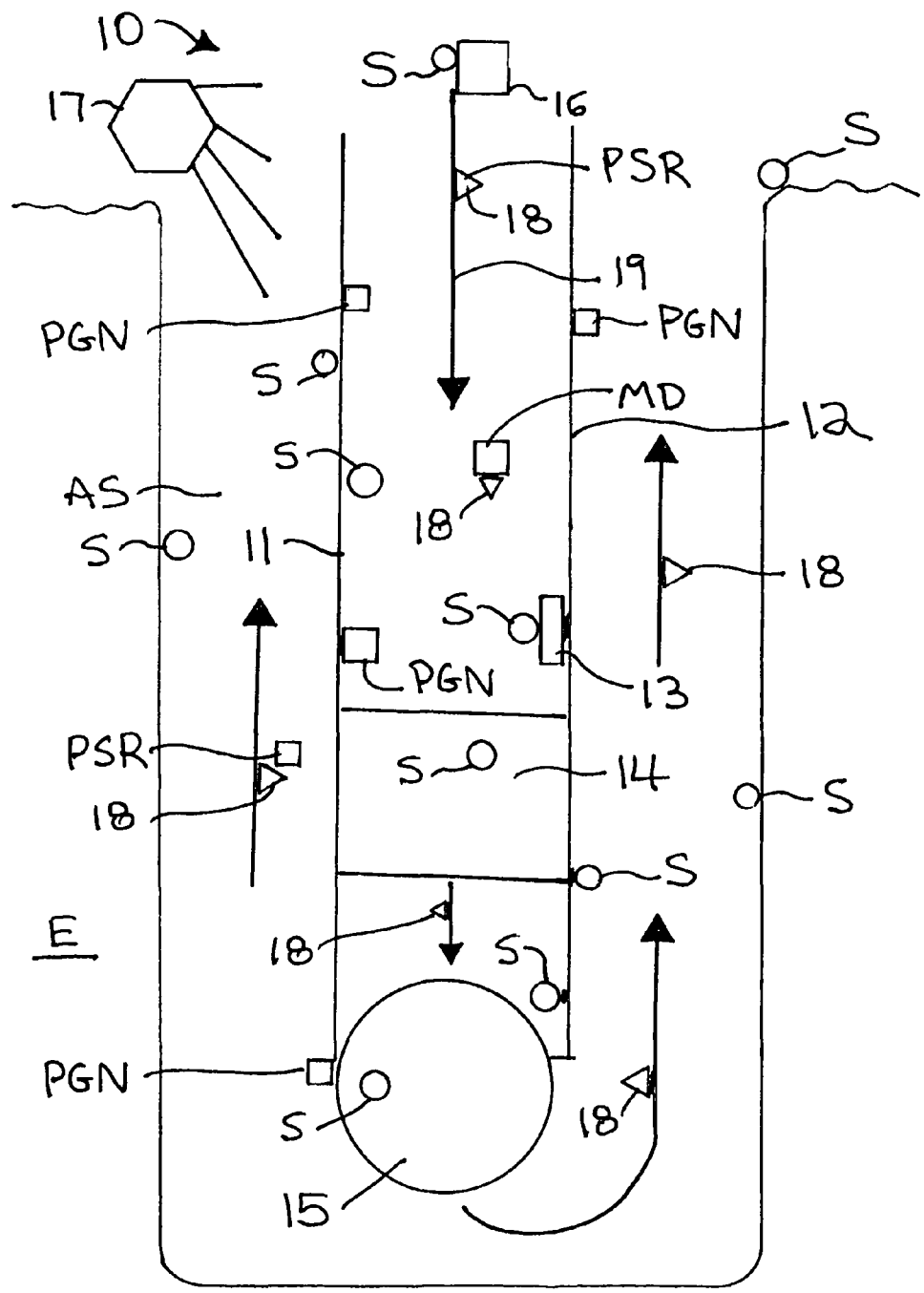
FIG. 1 is a schematic view of a system according to the present invention.

Certain embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of certain embodiments and are not intended to limit the invention or the appended claims. On the contrary, the intention is to cover all modifications, equivalents and alternatives falling within the spirit and scope of the invention as defined by the appended claims. In showing and describing these embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiments, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

In various embodiments, the present invention provides methods for drilling a wellbore in the earth in which fluid flows and/or is pumped down a hole (wellbore) in the earth and/or flows or is pumped through an apparatus and/or tubular or tubular string, in one aspect with a tubular string in fluid communication with a bore forming apparatus (e.g., but not limited to, a drill bit, percussion system, or hammer). Fluid used in such methods may have one McNano device or a plurality of McNano devices therein, or which are selectively introduced thereinto which operate and/or are operated to provide any of the functions of which such devices are capable, including, but not limited to, use of a McNano device for item or location detection, parameter sensing, information, identification transmitting, apparatus activation, leak detection, closure detection, fluid movement identification and tracking, velocity determination, item identification, item location, indication of fluid passage, indication of item movement and/or item movement or cessation or location, chemistry, and/or substance or chemical delivery. It is to be understood that any McNano device in any embodiment described below may be used for any of these functions. Also, depending on the particular wellbore environment (within the earth or on the surface, within a wellbore and/or within an item or apparatus), suitable McNano device(s) are used which survive in the environment, including, but not limited to, devices with desired protective coatings and devices made of appropriate materials. Suitable apparatus or apparatuses are used to energize a McNano device so that it can be energized and/or identified and/or communicated with; so that it can commence to perform a desired function; so that its presence can be determined; so that its movement can be determined; and/or so that a function it is to perform can be initiated or so that a function it is performing can be stopped; and such apparatuses ("apparatuses S") can include any known apparatus used to energize, interrogate, control, and/or identify a Mcnano device; and in the embodiments described below, an apparatus called an "apparatus S" is meant to encompass any of these apparatuses. Such apparatuses S may be located at any possible location in a wellbore; in a conduit; and in or on thing, item, or piece of equipment. Similarly, a McNano device or devices may be in any fluid, in or on any piece of equipment, and in or on any conduit.

FIG. 1 illustrates schematically a method 10 according to the present invention in which McNano devices 18 (not shown to scale) in a fluid 19 (indicated by arrows pointing down, as viewed in FIG. 1, and pointing up) move within a wellbore 8 being formed in the earth E. The wellbore formation method may be like any known method in which a drilling apparatus DA forms a hole in the earth. The drilling apparatus DA may be a rotary drilling system, a top drive drilling system, a casing drilling system, a coil tubing drilling system, an air drilling system, a percussion drilling system, or a cable drilling system. In one aspect, as shown, a drill bit 15 on the bottom of a tubular string 12 is rotated to form the wellbore 8. The fluid 19, as is well known, flows from the surface, through the tubular string 12, to and through the bit 15, and then upwardly in an annular space AS back to the surface. Optionally, the fluid 19 flows past wellbore apparatus 13. Optionally, the fluid 19 flows through the wellbore apparatus 14. In a casing drilling operation, the string 12 is a casing string.

It is within the scope of the present invention for one or a plurality of two or more McNano devices to be used to activate an activatable device 14 through which fluid flows. In one aspect, the device 14 has therein or thereon an apparatus S (which may be any known apparatus or device for signalling, energizing, interrogating and/or communicating with a McNano device-as is true for any other apparatus S in the drawing figures and in the embodiments described below). Once the presence of a McNano device 18 is sensed by the apparatus S, either the apparatus S activates the device 14 or the apparatus S signals another apparatus, downhole or at the surface, to activate the device 14. The device 14 may be any activatable device including e.g., but not limited to, packer, float apparatus, mud motor, measurement apparatus, logging apparatus, sensor apparatus, drill bit, and valve. As is true for any embodiment herein, such communication may be accomplished by any known system or apparatus for communicating downhole in a wellbore. The McNano devices are of such a size that they flow unimpeded through the tubular string 12 and through items or apparatuses they encounter at the surface and in the wellbore in equipment and conduits (including without limitation float collars, valves, packers, drill bits and mud motors) without damaging the items and apparatuses and without adversely affecting a function of the items or apparatuses or of the McNano devices.

Similarly, it is within the scope of the present invention for one or a plurality of two or more McNano devices to be used to activate a device 13 which is an activatable device 13 past which fluid with a McNano device flows. In one aspect, the device 13 has therein or thereon an apparatus S. Once the presence of a McNano device 18 is sensed by the apparatus S associated with the device 13, either the apparatus S activates the device 13 or the apparatus S signals another apparatus, downhole or at the surface, to activate the device 13.

In certain aspects, a device 13 or a device 14 senses parameters (e.g. environmental, material, or operational parameters), provides signals indicative of or about these parameters, and/or communicates information indicative of or about these parameters. In certain aspects, a McNano device senses a parameter and, via an apparatus S, the McNano device conveys the parameter sensed and/or a level sensed to the device 13 or 14. In another aspect, sensing of a McNano device by a device 13 or 14 provides the go-ahead signal to the device 13 or 14 to either begin a parameter sensing function or to communicate sensed information from the wellbore.

Circles in FIG. 1 bearing a label "S" indicate that apparatuses S may be used in or on the items in the wellbore 8 and on the interior of the wellbore 8. One McNano device or a plurality of McNano devices can sense and convey information about environmental, material, and/or operational parameters (e.g. temperature, pressure, chemistry). Also, with a McNano device on a moving device or item MD, the location and/or speed of the item can be noted and monitored by an appropriate apparatus S or by appropriate apparatuses S.

A control system 17 is in communication with an apparatus S and, in certain aspects, with a selected apparatus S, selected apparatuses S, or all such apparatuses. The system 17 can communicate with apparatuses S to obtain information about parameters sensed by an apparatus S and/or to signal an apparatus S to begin to energize and/or interrogate a McNano device. The control system S may include or be used with the control functions of any known rig or drilling control system. Fluid 19 may be provided by a fluid system 16 which may be any fluid system used in known drilling methods, including, but not limited to, a drilling fluid circulation system or a pneumatic system. It is within the scope of the present invention for the system 16 to introduce a McNano device into the fluid 19 or to have such device(s) introduced into the fluid 19 at any desired point within the wellbore 8 or at the surface. As is true for any McNano device in any system or method hereing, the McNano devices 18 may have or be associated with a power source or power supply PSR (two shown schematically and not to scale in FIG. 1). Optionally, a power supply or power generator PGN (shown schematically and not to scale in FIG. 1) may be used to provide power to the McNano devices 18 (and this can be done for any McNano device in any embodiment according to the present invention.

Figure 2:
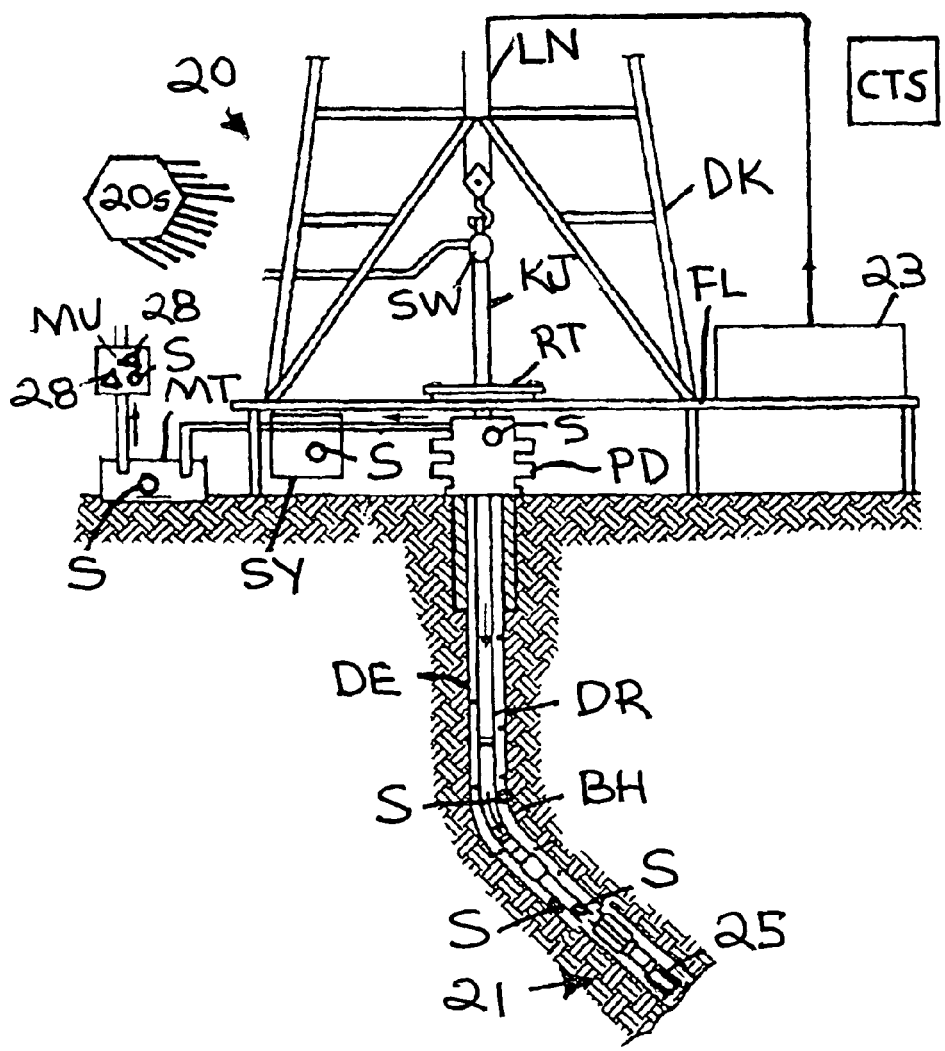
FIG. 2 is a schematic view of a system according to the present invention.

FIG. 2 shows a schematic diagram of a drilling system 20 according to the present invention having a drilling assembly 21 in a borehole BH for drilling a wellbore. The drilling system 20 includes a derrick DK having a floor FL which supports a rotary table RT that is rotated by a prime mover whose motor (not shown) is controlled by a motor controller (not shown). A drill string DR includes drill pipe DE extending downward from the rotary table through a pressure control device PD (e.g., but not limited to, one or more blowout preventers) into the borehole. A drill bit 25, attached to the drill string end, disintegrates the geological formations when it is rotated to drill the borehole. The drill string is coupled to a drawworks 23 via a kelly joint KJ, swivel SW and line LN through a pulley (not shown). This description is drawn to a land rig, but the invention as disclosed herein is also equally applicable to any offshore drilling rigs or systems. Alternatives to conventional drilling rigs, such as coiled tubing systems (shown schematically as CTS), can be used to drill boreholes, and the invention disclosed herein is equally applicable to such systems.

Mud pump MU pumps drilling fluid into the drill string via the kelly joint KJ and the drilling fluid is discharged at the borehole bottom through an opening in the drill bit. The drilling fluid has one or a plurality of McNano devices 28 therein (not shown to scale) which are sized to flow from the mud pumps, through the wellbore, through items and apparatuses encountered in the wellbore and at the surface, and back to the mud pumps. The drilling fluid circulates uphole through an annular space between the drill string and the borehole and returns to a mud tank MT via a solids control system SY. The solids control system may include shale shakers, centrifuges, and other known solids control equipment through which the McNano devices flow without being separated from the fluid and without adversely affecting what they flow through.

A control system 20s (like the system 17, FIG. 1) controls the apparatuses and equipment of the system 20 and is in communication with apparatuses S (like the apparatuses S, FIG. 1). The McNano device(s) 28 may be used like the McNano devices 18 of FIG. 1.

Figure 3:
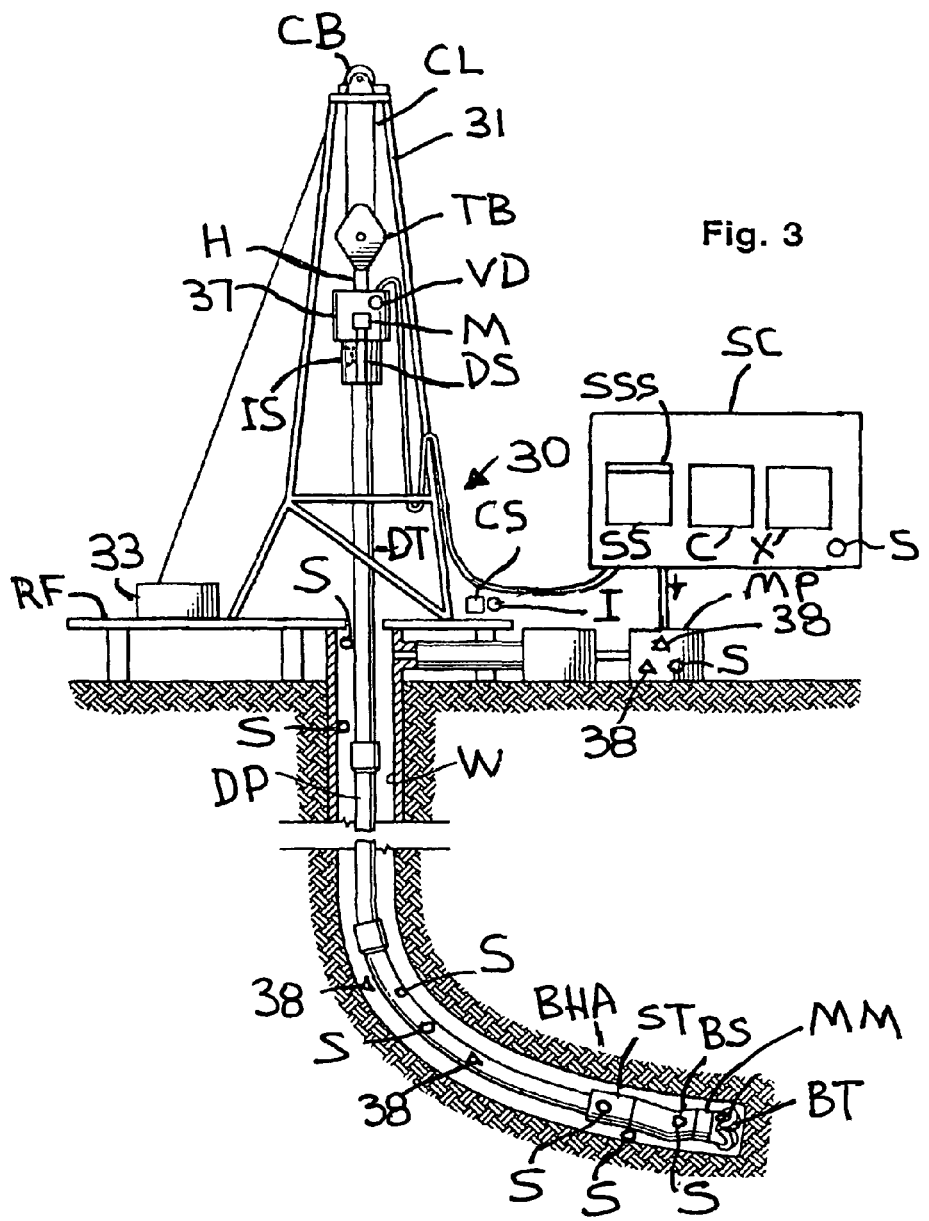
FIG. 3 is a schematic view of a system according to the present invention.

Referring now to FIG. 3, a drilling rig 30 according to the present invention is depicted schematically as a land rig, but other rigs (e.g., offshore rigs, jack-up rigs, semisubmersibles, drill ships, and the like) are within the scope of the present invention (and this is true for the embodiments of rigs and wellbore operations described below also). In conjunction with an operator interface, e.g. an interface I, a control system, CS controls certain operations of the rig. The rig 230 includes a derrick 31 that is supported on the ground above a rig floor RF. The rig 30 includes lifting gear, which includes a crown block CB mounted to the derrick 31 and a traveling block TB. The crown block and the traveling block are interconnected by a cable CL that is driven by drawworks 33 to control the upward and downward movement of the traveling block. The traveling block carries a hook H from which is suspended a top drive system 37 which includes a variable frequency drive controller VD, a motor M (or motors) and a drive shaft DS. The top drive system 37 rotates a drillstring DT to which the drive shaft is connected in a wellbore W. The drillstring is coupled to the top drive system through an instrumented sub IS which can include sensors that provide information, e.g., drillstring torque information. The drillstring may be any typical drillstring and, in one aspect, includes a plurality of interconnected sections of drill pipe DP a bottom hole assembly BHA, which includes appropriate stabilizers, drill collars, and/or an apparatus or device, in one aspect, a suite of measurement while drilling (MWD) instruments including a steering tool ST to provide bit face angle information. Optionally a bent sub BS is used with a downhole or mud motor MM and a bit BT, connected to the BHA.

Drilling fluid DF with McNano device(s) 38 (not shown to scale) is delivered to the drillstring by mud pumps MP through a mud hose MH. During rotary drilling, the drillstring is rotated within the bore hole by the top drive system. Fluid from the well, McNano device(s) 38, and cuttings produced as the bit drills into the earth are moved out of bore hole by mud pumps. The fluid from the well flows to solids control equipment SC which may include one or more shale shakers SS with one or more shale shaker screens SSS; one or more centrifuges C; and/or other fluid processing equipment X (e.g., but not limited to, degassers, desilters, desanders, and hydrocyclones).

The control system CS (like the system 17, FIG. 1) controls the apparatuses and equipment of the system 30 and is in communication with apparatuses S (like the apparatuses S, FIG. 1). The McNano device(s) 38 may be used like the McNano devices 18 of FIG. 1 or of FIG. 2.

Methods according to the present invention include drilling a wellbore utilizing a casing string that will be cemented into the wellbore as the drill string. The casing string, each piece thereof, a drill bit, any equipment associated with the drillbit, and equipment and apparatus used in cementing, the fluid used during drilling, and/or the cement may have one McNano device or a plurality of McNano devices to provide a function thereof or multiple functions thereof to facilitate and enhance the casing drilling and/or cementing operation. In one aspect, the wellbore is drilled to a desired depth, and the casing is pulled upwardly a distance from the bottom of the drilled wellbore. This distance can be ascertained by using a McNano device on the casing end and an apparatus in the wellbore to identify the device, interrogate it, and then signal the device's location. Alternatively, the device itself signals its location and this information is conveyed from the wellbore. The drill bit on the lower end of the casing can be retrievable or disposable (e.g., drillable or disintegratable) and in one aspect is drilled through and in another aspect is blown off using an explosive charge on a wireline, or it is disconnected from the casing by other means known in the art. The drill bit itself may have one McNano device or a plurality thereof for indicating the presence of the drill bit, its location, and/or its movement and progress. Suitable apparatus on the drill string and/or in the wellbore is used with respect to the McNano device(s) to energize, interrogate, analyze, process, gather information from, and/or convey gathered information to the surface (as any apparatus S may do). Any suitable known information transmitting system or apparatus used in wellbore communications may be used, including, but not limited to, wired and wireless systems (as is true for any system according to the present invention disclosed herein); and, as is also true for any system herein, such information may be conveyed to the surface site of the drilling rig and/or conveyed to a remote site for control therefrom or use thereat, e.g, but not limited to, by satellite systems or the Internet.

Upon removal of the drill bit from the lower end of the casing, mud or other circulating fluids may be circulated through the casing, the mud or other fluid containing one McNano device or a plurality thereof. These device(s), in conjunction with apparatuses S, can be used to indicate that the fluid is flowing, that it is flowing at a desired rate, that it is flowing at a desired pressure, that it has reached a desired location in the string, that it has a desired temperature, that it has a desired chemistry, that it has not stopped flowing, etc. A bottom cementing plug can then be displaced into the casing ahead of the cement. The bottom cementing plug, which may have one or more McNano devices thereon or therein for identification and which may thereby be tracked, is allowed to pass through the open lower end of the casing and cement passes around the lower end of the casing upwardly into the annulus between the casing and the wellbore. Tracking the bottom plug indicates that it is moving and functioning as desired. Once the desired amount of cement has been displaced into the casing which can be indicated by interrogating McNano devices in the cement using apparatus S, a top cementing plug is placed in the casing behind the trailing edge of the cement. The top plug may have McNano device(s) therein or thereon for identification and tracking thereof. The top plug and the cement therebelow are urged downwardly in the casing by drilling mud or other known displacement fluids, either of which may also have McNano device(s) therein. Once the desired amount of cement has been placed in the annulus between the casing and the wellbore to cement the casing in the wellbore, which may be indicated by the McNano device location(s), which may occur either before or after the top cementing plug exits the casing, flow of the displacement fluid is stopped. Pressure may be maintained utilizing a valve system at the surface, typically in connection with a plug container. Prior to conducting any further operations or procedures, it is often necessary to wait several hours to insure that the cement is adequately set up prior to removing surface equipment, such as the plug container, and then reassembling the wellhead. Cement setting can be indicated by McNano device(s) measuring cement parameter(s) indicative of setting and information related thereto can be obtained from the device(s) with apparatuses S and transmitted to appropriate reception apparatus at the surface.

According to the present invention, a casing drilling system may include a check valve placed in the casing after the drill bit is disconnected from the casing. The check valve may have McNano device(s) therein or thereon for identification and for any of the other functions of such devices and may be a part of a float apparatus, e.g, part of a float shoe which includes an outer case with the check valve connected therein. The float shoe may also have therein or thereon McNano device(s). The check valve may include a valve body connected in the outer case. The valve body defines a valve seat. The check valve also includes a valve poppet which includes a valve element that is engageable with the valve seat. Any individual part of the valve may also have its own dedicated McNano device(s) which provide any of the function(s) of such devices, including, but not limited to, location indication, identification, and movement thereof.

In one aspect, the float shoe is connected to a packer apparatus which is lowered into the casing to a desired location in the casing. The packer apparatus may have McNano device(s) therein or thereon which provide any of the functions of such devices. The packer apparatus can be lowered into the casing on a wireline or by other means known in the art. The wireline itself may have McNano device(s) which provide any of the functions of such devices. Once the packer apparatus is lowered into the casing, (and its correct movement and end location may be indicated by a McNano device thereon), it is set in the casing so that it will hold the packer apparatus and the float shoe in the casing. The wireline is then removed and cementing operations can begin. A bottom cementing plug may be placed in the casing ahead of the leading edge of cement. The bottom cementing plug will land on an upper end of the packer apparatus and a rupturable diaphragm will burst allowing cement to flow through the bottom cementing plug, the packer apparatus and the float apparatus. The rupturable diaphragm may have McNano device(s) which provide any of the functions of such devices. Cement will be displaced into the annulus between the casing and the wellbore. This can be indicated by McNano device(s) in the cement. Once a sufficient amount of cement has been placed in the casing (which can be indicated by McNano device(s) in the cement), a top cementing plug may be placed in the casing behind the trailing edge of the cement and will be urged downwardly with a displacement fluid. The top cementing plug will land on the bottom cementing plug (which landing may be indicated by McNano device(s) on the plug). The float apparatus will prevent the back flow of cement into the casing and this also can be indicated by McNano device(s).

Figure 4A:
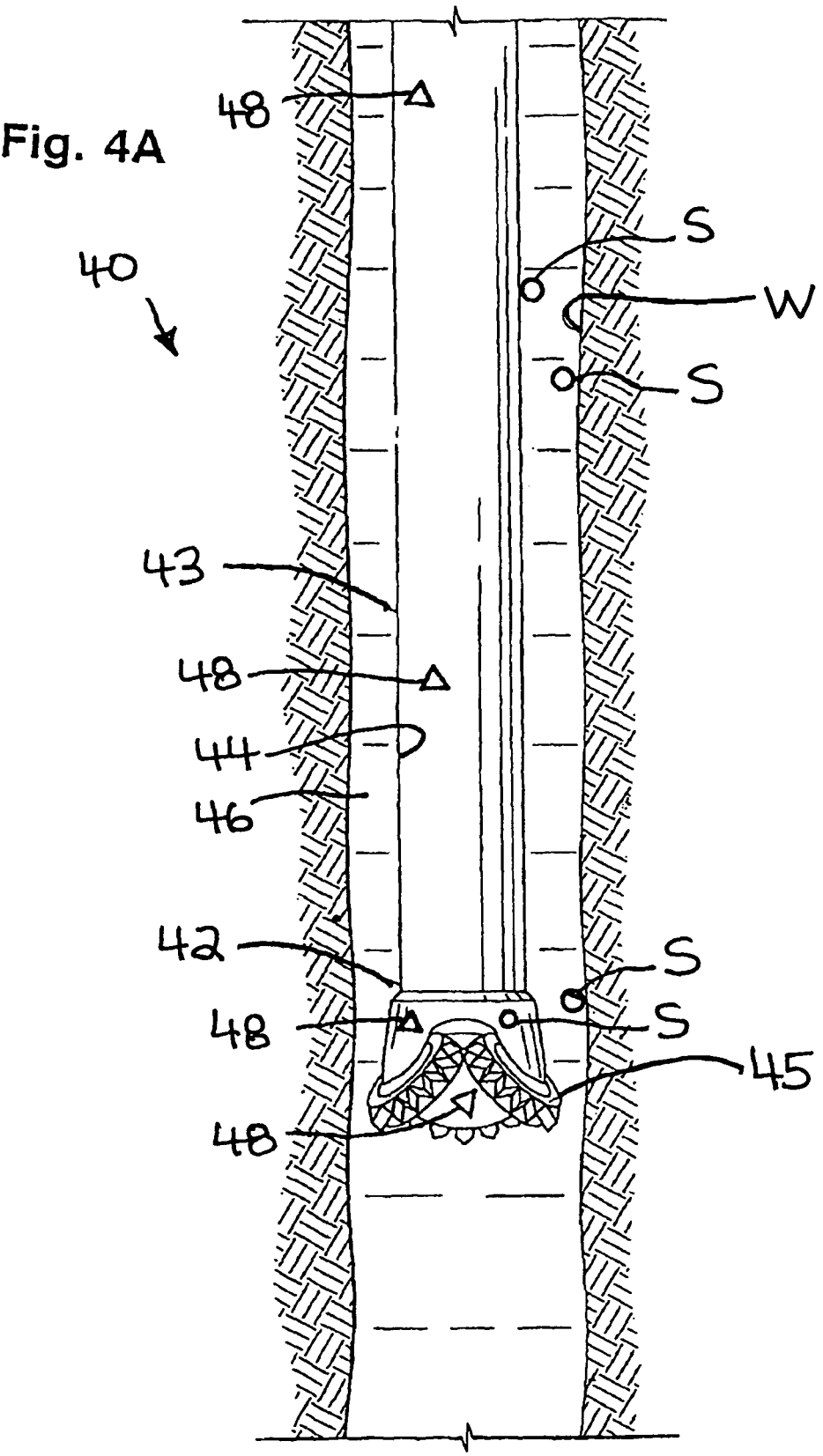
FIG. 4A is a side schematic view of a casing drilling system according to the present invention with a float system according to the present invention.

As shown in FIG. 4A, in a method 40 according to the present invention, a wellbore W is shown with a casing string 41 disposed therein. A drill bit 45 is connected to a lower casing end 42 by any conventional means known in the art. Wellbore W is being drilled by drill bit 45 attached to casing string 41. The casing has an outer surface 43 and an inner surface 44 and an annulus 46 is defined between the outer surface 43 and the interior of the wellbore W. McNano device(s) 48 are provided on the casing (on any or every piece) and/or on the bit 45. These McNano device(s) may be on or in the casing and the bit and they provide any of the functions of such devices, as do the apparatuses S in FIGS. 4A-4E.

Figure 4B:
FIG. 4B is a side cross-section schematic view of a the system of FIG. 4A.

A float system FL is shown in FIG. 4B lowered into wellbore W. The apparatus FL can be lowered into casing in any suitable known manner, including, but not limited to, on a wireline apparatus 440 using a wireline setting device WD which may be of any type known in the art. The float system FL includes a packer apparatus or packer assembly PK having an upper end and a lower end. The float system, FL further includes a float apparatus 448 (see FIG. 4C) connected to the packer assembly. In the embodiment shown, the float apparatus is a float shoe, but may be other float apparatus. A coupling 450 is connected at threaded connection 452 to lower end of the packer apparatus and is connected at a threaded connection 454 to the float apparatus.

In FIG. 4B the packer apparatus is shown in an unset position so that a space or annulus is defined between the packer apparatus and the inner surface of the casing. The packer apparatus PK may have McNano device(s) 48 which indicate, among other things, the location of the outer surface of the packer. FIG. 4D shows the packer assembly in a set position wherein the packer assembly is engaged with casing to hold the apparatus FL, and more specifically the packer apparatus and the float apparatus 448 in casing. McNano device(s) 48 of the float apparatus FL can indicate the correct positioning of the float apparatus, among other things. A spring SP may also have McNano device(s) which provide all the functions of such devices. The packer apparatus includes a packer mandrel 458 with upper end and lower end. A packer element assembly 460 is disposed about packer mandrel 458. The packer element assembly may include one or more packer elements 462 (any and all of which may have one or more McNano devices) and in the embodiment shown has three packer elements 462. The packer element assembly 460 has an upper end and a lower end. When the packer apparatus is in its set position, packer element assembly 460 sealingly engages the casing sufficiently to hold the packer apparatus and the float apparatus 448 in place in the casing. The packer apparatus has a packer retaining shoe or retaining ring 468 at the upper and lower ends of the packer element assembly for axially retaining the packer element assembly. The packer mandrel 458 defines a bore which is, in one aspect, an uninterrupted bore and has no obstructions from its upper end to its lower end.

The packer apparatus includes slip wedges 470 which may be referred to as upper slip wedge 472 and lower slip wedge 474. As is true for any part of the items and equipment shown in FIGS. 4A-4E, the wedges may have McNano devices 48 which provide any of the functions of such devices. These wedges operate as is disclosed in U.S. Pat. No. 7,234,522 which is incorporated fully herein for all purposes, and the structure of FIGS. 4B-4E may include the parts shown and described in this patent. The same is true for the float apparatus and the float shoe shown in these figures. Any of these parts may have McNano device(s) 48, some of which are shown schematically and not to scale in FIGS. 4A-4E.

The float apparatus 448 is lowered into the casing with a wireline or by any other means known in the art. In the embodiment shown, a wireline setting device 440 is shown connected to a tension sleeve which is in turn threadedly connected to an upper end of the packer apparatus so that the packer apparatus may be lowered into the casing on a wireline.

Figure 4C:
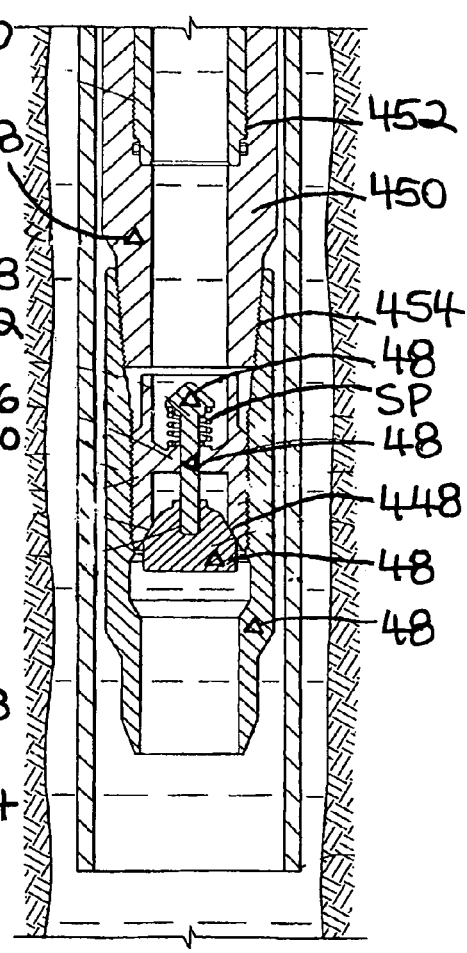
FIG. 4C is a side cross-section schematic view of a system according to the present invention.

Once the float apparatus FL has been lowered into the casing, the packer apparatus 462 is set using the wireline setting device 440 by any manner known in the art, and thus is moved into the position shown in FIG. 4C. As is known in the art, the wireline setting device will urge a setting ring assembly downwardly which will cause upper slip segments to engage the casing. The packer mandrel 458 can then be pulled upwardly with the wireline setting device 440. The coupling 450 will cause the upper slip segments to move upwardly and upward force will continue to be applied so that shear pins 478 and 476 break and the packer element assembly 460 is forced outwardly to engage the casing and will support the packer apparatus and the float apparatus in the casing. Continued application of upward force to the wireline setting device will cause the tension sleeve 412 to break so that the wireline setting device may be removed from the casing.

Once the float system FL has been placed in the casing and the packer apparatus has been set to engage and hold the float system therein (all or any of which can be ascertained via use of McNano devices), fluid may be displaced therethrough to condition the wellbore W for cementing. Once any such operations have been completed, a bottom cementing plug 414 of a type known in the art may be placed in casing ahead of a leading edge 416 of the cement in casing. As is known in the art, bottom cementing plug 414 will initially have a rupturable diaphragm across an upper end thereof. When the bottom cementing plug 414 lands on an upper end of the packer apparatus (which can be indicated by a McNano device, as any step or action can be so indicated), the flow of cement in the casing will cause the rupturable diaphragm to burst so that cement will flow through the packer apparatus and the float apparatus 448. The flow of cement will urge a valve poppet 496 downwardly to move the check valve 492 to an open position so that cement will flow through check valve 492. The cement will flow out of the casing into the annulus 46. Using McNano device(s) in the cement, these actions and/or this flow can be identified, ascertained, and confirmed. Once a desired amount of cement has been displaced into the casing (ascertainable and confirmable using Mcnano devices), a top cementing plug 418 is placed in the casing behind a trailing edge 420 of the cement. Once the flow of cement has stopped, the check valve 492 will move to its closed position preventing backflow of cement into the casing (which can be ascertained and confirmed by the use of McNano devices).

Figure 5:
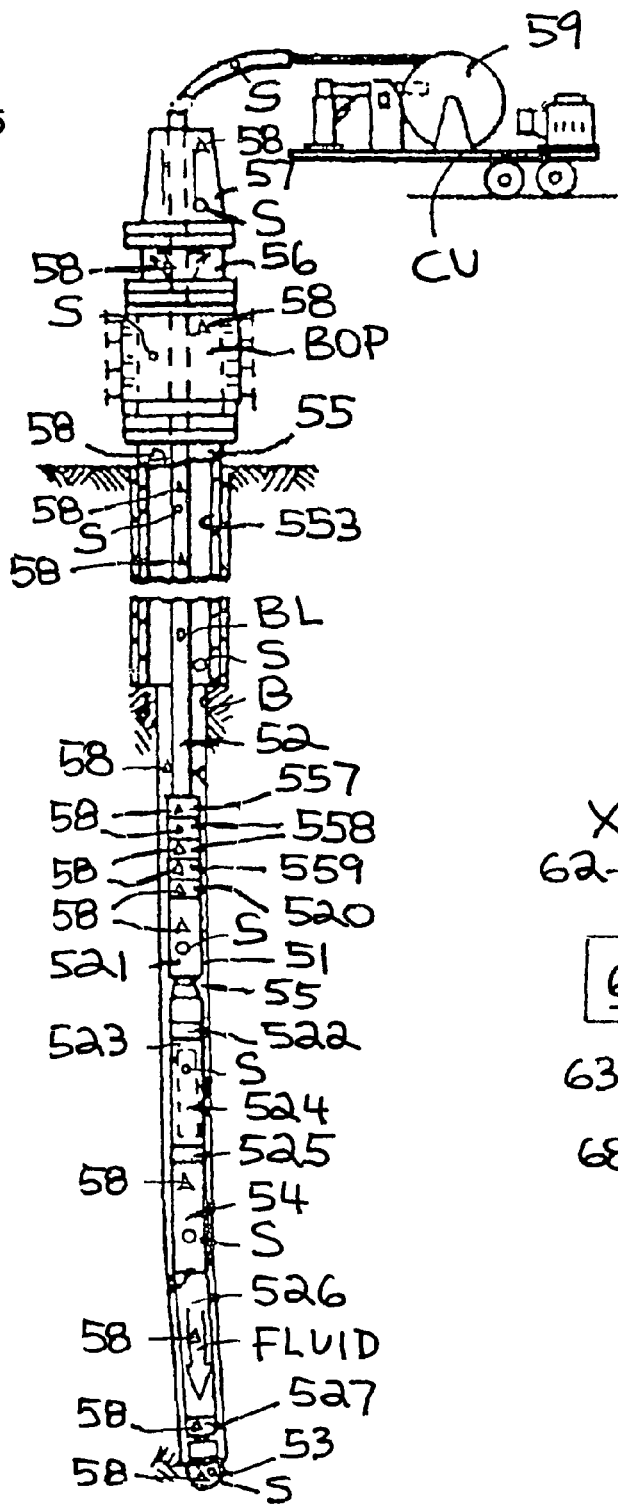
FIG. 5 is a side schematic view of a system according to the present invention.

It is within the scope of the present invention to use McNano device(s) in coiled tubing drilling systems and methods with corresponding apparatuses for communicating with the Mcnano device(s). Such a device or devices may be used in any fluid used in coiled tubing drilling and with any item, device, apparatus, or equipment used in coiled tubing drilling. FIG. 5 illustrates schematically a coiled tubing drilling system 50 according to the present invention and the drilling of a borehole B using a string of directional drilling tools indicated generally at 51 which is suspended in the borehole on coiled tubing 52. The tool string 51 includes a bit 53 that is rotated by a mud motor 54 in response to the flow of drilling mud under pressure which is pumped down the bore of the coiled tubing 52 and through the motor, out the jets of the bit 53, and back up to the surface through an annulus 55. The coiled tubing 52 is formed in a continuous length which is wound on a spool 59 of a coiled tubing unit CU which is parked near a wellhead W at the surface. The coiled tubing 52 typically is inserted into the top of the wellbore through a stripper 56 and a blow-out preventer BOP by operation of an injector 57. The preventer BOP typically is bolted to a well head at the top of casing 553 that has been cemented in place so that it lines the upper part of the borehole B. The tool string 51 is shown being used to drill a section of the borehole B below a lower end of the casing 553. As is described below in detail, the BOP can be activated by a method according to the present invention with advance warning of a kick.

The tool string 51 is connected to the lower end of the coiled tubing 52 by various components including a coiled tubing connector 557, a pair of upwardly closing check or float valves 558, a quick-release sub 559, and a cross-over sub 520. Check valves 558 can be hinged flapper devices, and the release sub 559 can include a sleeve having an upwardly facing ball seat that is held by shear pins. To release the device 559 in the event the tool string 51 should become stuck in the borehole, a ball BL is circulated down the coiled tubing 52 until it engages the seat and allows the pins to be sheared by differential pressure forces. When the pins shear, the release sub 559 separates so that the coiled tubing 52 can be removed from the well, and the tool string 51 later recovered by a fishing operation.

The cross-over sub 520 has different types and/or sizes of threads on its opposite ends which allow connection to the threads on the upper end of an orienting tool 521 which is constructed in accordance with the present invention. The lower end of the orienting tool 521 is attached to another cross-over sub 522 which connects to the upper end of a housing or collar 523 which is made of a suitable non-magnetic metal. An MWD tool 524 is mounted inside the collar 523, as shown in phantom lines. Although the MWD tool 524 can measure numerous downhole parameters and formation characteristics, for purposes of this description the tool includes an accelerometer package which measures the inclination of the borehole with respect to vertical, and a magnetometer package that measures the azimuth of such inclination. These two measurements, called directional measurements, can be converted from analog to digital or other form and then transmitted up to the surface in the form of mud pulses in the mud stream inside the coiled tubing 52. A surface pressure sensor (not shown) detects the signals and applies them to a signal processor where the analog values of the directional measurements are reconstructed. The MWD tool 524 can operate on a substantially continuous basis so that downhole directional parameters can be monitored at the surface at all times as the drilling proceeds. Any suitable MWD tool 524 can be used. A steering tool that is connected to the lower end of a wireline electrical cable which extends up through the coiled tubing 52 to the surface also can be used in lieu of, or in addition to, the MWD tool 24.

The MWD collar 523 is connected to the upper end of the mud motor 54 by a universal orienting sub 525 which is well known. The motor 54 may be any suitable mud motor and, in one aspect, is a "Moyno"-type positive displacement device which has a spiral ribbed rotor that rotates within a lobed stator, there usually being one less rib than lobe. When drilling mud is pumped through it, the rotor turns and drives an output shaft which is connected to its lower end by a suitable universal joint. The drive shaft extends down through the bore of a bent housing 526 of the motor 54 to where it drives the upper end of a spindle that is mounted in a bearing housing 527 and which has the drill bit 53 connected to its lower end. The bent housing 526 has a lower section which is connected at a bend angle to its upper section so as to provide a bend point.

It is within the scope of the present invention in the system 50 for any fluid and any apparatus or conduit to have one or more McNano devices 58 (like those described above; with any and all possible functions for those described above). Certain such devices 58 are indicated on the various things and items of the system 50 as shown in FIG. 5 and in the fluid for the mud motor 54 (see arrow labeled "FLUID" with device 58 indicated therein). Also, apparatuses S may be used on any item, thing, apparatus or equipment of the system 50 and in or on any conduit thereof for sensing, communicating with, controlling, energizing, and/or interrogating a device 58. Certain apparatuses S are shown in FIG. 5.

For example, and not by way of limitation, location of the ball BL and/or its passage or reaching a final location may be indicated by apparatuses S detecting or energizing-and-detecting a device 58 on the ball BL and identifying the device 58 as a device of the ball BL, therefore providing the actual location of the ball BL. An apparatus S at any point in the system can recognize a device 58 in the fluid flowing to the mud motor and, coupled with the location of the particular apparatus S, provide an indication of fluid flow as desired to and/or from the mud motor. The condition and/or parameters of the fluid can be sensed, indicated, and/or controlled via the McNano device(s). Flow of fluid to and through the annulus 55 can be indicated by sensing with apparatuses S of devices 58 in the fluid in the annulus 55. By controlling devices 58 on operational equipment, the equipment can be turned on or off and such devices can also identify the particular piece of equipment (as is true of any such McNano device herein).

Figure 6:
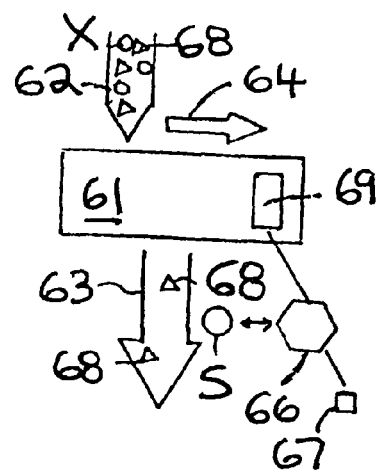
FIG. 6 is a schematic view of a system according to the present invention.

FIG. 6 illustrates a method according to the present invention for testing the efficiency of a separator 61 which separates solids X of a particular size from an input stream 62 that includes solids X. A McNano device or devices 68 is added to the flow 62. The device(s) are of the same size (e.g., of the same largest dimension) as the solids X so that, if the separator 61 is operating effectively, the device 68 is separated from the flow 62 and is discharged with the separated solids X in a stream 64. However, if the separator 61, for whatever reason, allows the device(s) 68 to pass through and to be discharged in a stream 63, this is an indication that the separator is not working as desired. An apparatus S detects the presence of the device(s) 68 in the stream 63. The apparatus S can then communicate with a control system 66 (on-site and/or remote) which in turn can activate an alarm 67 and/or can alert and/or inactivate a system 68 which controls the input stream 62 and can alter it or stop it. The separator 61 can be, e.g. and not by way of limitation, any known apparatus, filter, screen, centrifuge, cyclone, solids control apparatus, or hydrocyclone and can include any filter media, screening material, filter, mesh, etc.

Figure 7:
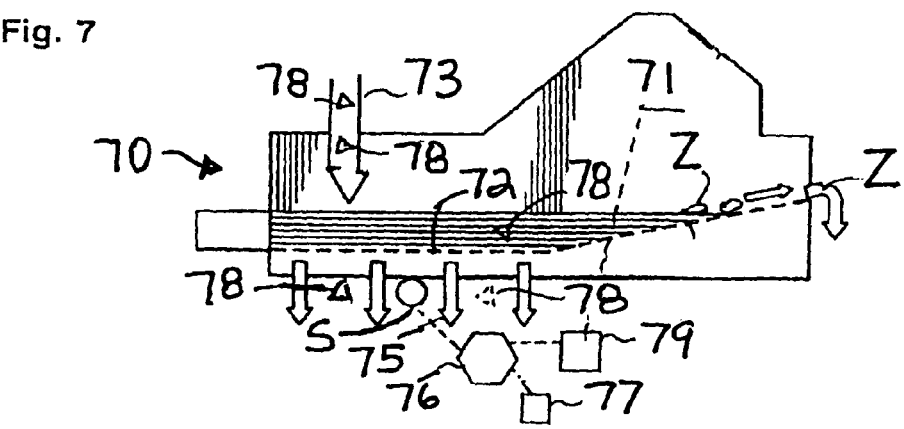
FIG. 7 is a schematic view of a system according to the present invention.

FIG. 7 illustrates a method 70 according to the present invention for testing the effectiveness of screens used in vibratory separators to screen out solids from an initial flow stream. An initial feed stream 73 is fed to a vibratory separator 71 that has a screen (or screens) 72. The screen(s) 72, when operating correctly and when undamaged, screen out solids Z from the stream 73. The solids Z are of a known size (largest dimension) and the screen(s) is chosen with mesh that will screen out solids of this size. McNano device(s) 78 of the same largest dimension as the solids Z is/are added to the stream 73. If the screen(s) 72 are effective, the McNano device(s) 78 will be screened out and will flow with the solids Z off the top of the screen(s) 72 to a discharge area. If the screen(s) 72 are not effective, (e.g., the screen material is torn or is of the incorrect mesh size or pattern, or if the screen is not correctly mounted to the vibratory separator or not sealingly mounted thereto), then the McNano device(s) 78 will pass through or by the screen(s) 72 and flow away in a stream 75 (four down pointing arrows below separator 71; McNano devices 78 that have passed through screen 72 shown in dotted lines). An apparatus S detects the presence of the device(s) 78 in the stream 75. The apparatus S can then communicate with a control system 76 (on-site and/or remote) which in turn can activate an alarm 77 and/or can alert and/or inactivate a system 79 which controls the vibratory separator 71 and/or controls the input stream 73 and can alter it or stop it.

In one particular aspect the stream 73 is a stream of drilling fluid or mud that contains solids (e.g., and not by way of limitation debris, drilled cuttings, and/or drilled solids) which are to be screened out of the fluid by known screen(s) often called "shale shaker screens" with a vibratory separator often called a "shale shaker." The screen(s) 72 may be any known shale shaker screen and the separator 71 may be any known shale shaker. Using a plurality of apparatuses S (and this is true for the system of FIG. 6) the location of a tear in a screen or the location of a poor sealing area for screen mounting can be indicated by the flow in that area containing McNano device(s) detected by an apparatus S whose location is known.

Figure 8:
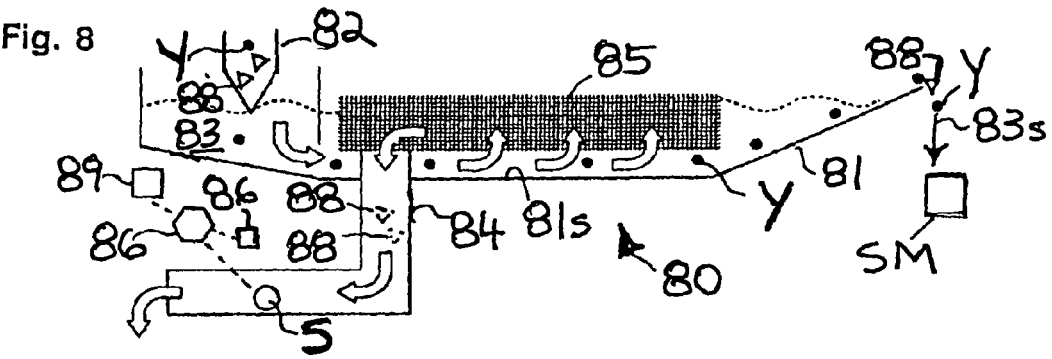
FIG. 8 is a schematic view of a system according to the present invention.

Referring now to FIG. 8, in a method 80 according to the present invention, solids-laden fluid, drilling fluid, or drilling mud in an initial stream 82 is introduced into a pool 83 in a separator 81, and the stream 82 is forced up to a vibrating screen 85 that screens out pieces of solids Y of a particular known size (i.e., the fluid flows up to and through the screen 85, but the solids Y do not flow through the screen 85). Fluid free of the solids Y flow via conduit(s), pipe work or channels 84 to containers, e.g., reservoirs or tanks, for subsequent re-use. The cleaned fluid (e.g., but not limited to, drilling mud) may either exit the separator 81 from the sides or bottom thereof. The solids Y fall under gravity to a lower surface 81s, from which they are conveyed, e.g. by pumping or via a moving belt. The solids Y may be wet with fluid and may be sent in a stream 83s to another system SM, e.g., a screw press, centrifugal device or shaker to further recover fluid, e.g. drilling fluid or mud.

McNano device(s) 88 of the same largest dimension as the solids Y is/are added to the stream 82. If the screen 85 is effective, the McNano device(s) 88 will be screened out and will flow with the solids Y from the screen 85. If the screen 85 is not effective, (e.g., the screen material is torn or is of the incorrect mesh size or pattern, or if the screen is not correctly mounted to the vibratory separator or not sealingly mounted thereto), then the McNano device(s) 88 will pass through or by the screen 85 and flow away in the stream 84 (McNano device shown in dotted line in stream 84). Apparatuses S detect the presence of the device(s) 88 in the stream 84. The apparatus S can then communicate with a control system 86 (on-site and/or remote) which in turn can activate an alarm 86s and/or can alert and/or inactivate a system 89 which controls the separator 81 and/or controls the input stream 82 and can alter it or stop it.

Figure 9:
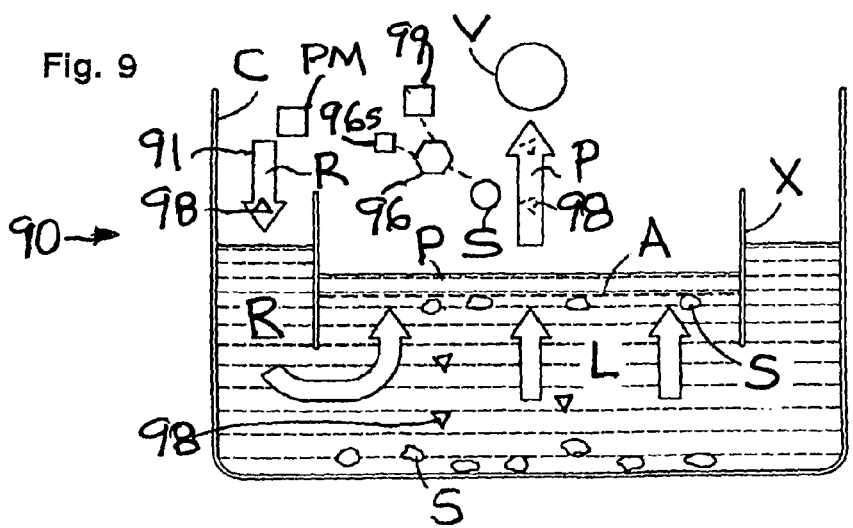
FIG. 9 is a schematic view of a system according to the present invention.

FIG. 9 illustrates a method 90 according to the present invention in which an initial stream 91 flows into a container C. The stream 91 contains material R, e.g. material including liquid L and solids S. Optionally, the stream 91 is pumped with a pump PM. The material R flows to a screen apparatus A which is mounted in a basket or box X. Part P of the material, e.g. liquid or liquid plus some solids which are of such a size that they pass through the screen apparatus A and flow up through the screen apparatus A. The part P is removed from the system by removal apparatus V (e.g. vacuum or pump apparatus). The screen apparatus A is sized to screen out solids of the size of solids S and part of the material R, e.g. solids S and agglomerations or masses of solids. The solids S either settle down in the container C without contacting the screen apparatus A or, upon being prevented from further upward flow by the screen apparatus A and/or by material already adjacent the screen apparatus A, fall downwardly in the container C. It is within the scope of the present invention for the screen apparatus A to be any suitable known screen or screen assembly used for vibratory separators or shale shakers. In one particular aspect the material R is drilling fluid or mud with drilling fluid and drilled solids.

McNano device(s) 98 of the same largest dimension as the solids S is/are added to the stream 91. If the screen apparatus A is effective, the McNano device(s) 98 will not flow therethrough and will flow with the solids S away from the screen apparatus A. If the screen apparatus A is not effective, (e.g., the screen material is torn or is of the incorrect mesh size or pattern, or if the screen is not correctly mounted or not sealingly mounted thereto), then the McNano device(s) 98 will pass through or by the screen apparatus A and flow away with the part P (McNano devices shown in dotted lines). Apparatuses S detect the presence of the device(s) 98 in the part P. The apparatuses S can then communicate with a control system 96 (on-site and/or remote) which in turn can activate an alarm 96s and/or can alert and/or inactivate a system 99 which controls the overall system and each component and/or controls the input stream 91 and can alter it or stop it.

Figure 10A:
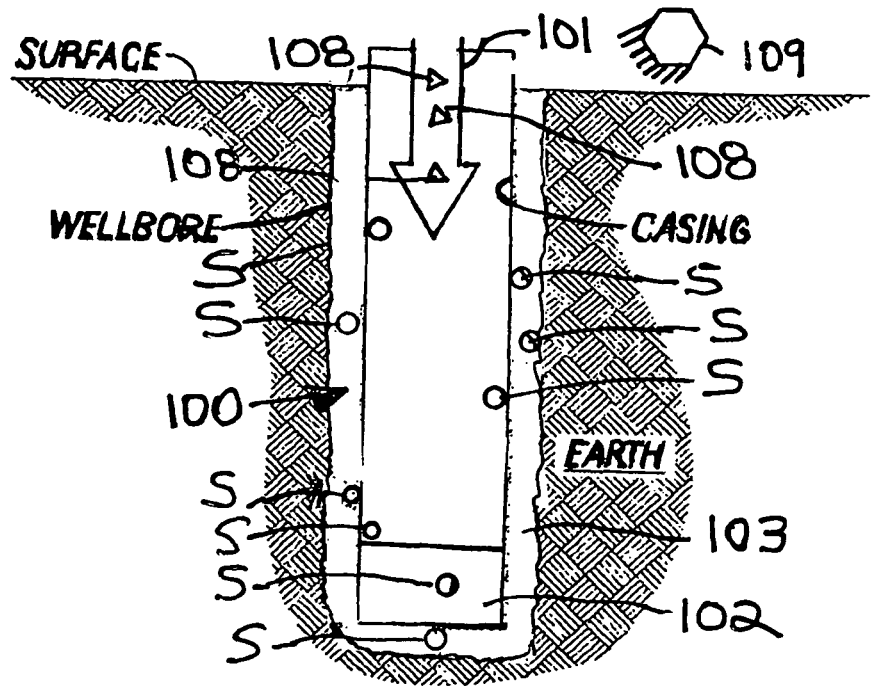
FIG. 10A is a schematic view of a system according to the present invention.
Figure 10B:
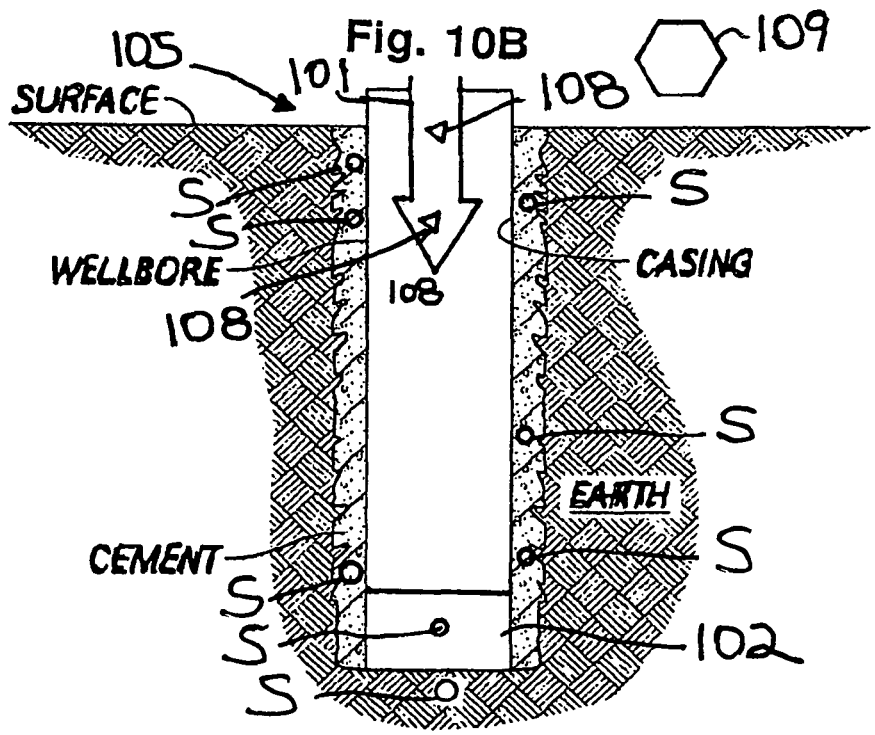
FIG. 10B is a schematic view of a system according to the present invention.

FIGS. 10A and 10B illustrate methods according to the present invention for testing the integrity of casing within a wellbore ("WELLBORE"); FIG. 10A, casing which has not been cemented and FIG. 10B casing which has been cemented (like numerals indicate like things in these two drawing figures). As shown in FIG. 10A, a stream 101 is introduced into the interior of the casing ("CASING"). A float apparatus 102 is closed so that the stream 101 cannot flow from the casing into an annulus 103. The stream 101 has a McNano device or devices 108 which can be detected by apparatuses S. If an apparatus S outside the casing (either on the casing or in the wellbore) detects a McNano device 108, this means that the device exited the casing either through a hole or defect in the casing or through an opening or path through an area at which two pieces of casing are connected, e.g. at a threaded joint or at a welded joint. Thus detection of a McNano device outside the casing indicates a lack of casing integrity. The apparatuses S communicate with a system 109 to convey the information regarding the detection of the McNano device(s) outside the casing and of the failure of casing integrity. By using multiple apparatuses S the location of the failure can be pinpointed or indicated when a first apparatus S first indicates detection of a McNano device.

As shown in FIG. 10B, when the casing has been cemented in the wellbore, the casing can also be tested for integrity and the cement too can be tested. With apparatuses S on the casing, on the wellbore, and/or in the cement, the presence of Mcnano device(s) 108 in the cement can be detected, indicating a flaw or void in the cement. In one aspect, the float apparatus 102 is open for such a test. In other aspects, it is closed.

FIGS. 11A-11C show a method 110 according to the present invention for following the progress of an amount of fluid 114 down a casing 111 and then up into an annulus 113 of a wellbore W. The amount of fluid 114 has a McNano device or devices 118 which are detected by apparatuses S within the casing 111, apparatuses S within and outside a float apparatus 112, and apparatuses S within or on the wellbore W. Sequential detection of the McNano device(s) indicates that flow path is clear. Cessation of detection at any particular point can indicate a blockage at that point. Fluid flow rate can also be determined using the device(s) 118 and the apparatuses S. The apparatuses S are in communication with a control system (not shown) like any disclosed herein. Also, the method 110 can disclose the location of the fluid 114 at any given time; its temperature; the pressure at its location; and the pH. Optionally, the fluid 114 is selectively heatable by activating the device(s) 118.

Methods according to the present invention can be used to test the integrity and seal of threaded connections. A method 120 according to the present invention for exterior testing shown in FIG. 12A employs a flow 129 of fluid with McNano device(s) 128 which flows to the location of a threaded connection 124 of tubulars 122 (e.g., pipe, risers, tubing, casing). Optionally, a blocker 123 blocks off part of the interior of the connection. The fluid 129 flows adjacent the connection 124. If the connection is good, no fluid escapes along the threads to the exterior of the connection. If the connection is not good, fluid 129 escapes and an apparatus S (or apparatuses S may be used) detects a McNano device 128 (or devices) which has passed through the connection. Optionally, an enclosure E is used around the apparatus S.

A method 125 according to the present invention for interior testing shown in FIG. 12B employs a fluid 129a with McNano device(s) 128 which flows, if there is a bad connection 127 between tubulars 121a and 122a, through the connection 127 to the interior of the connection. Optionally, blockers 126 isolate a space within the connection in which is one or more apparatuses S which can detect McNano device(s) 128 which are in the fluid 129*a* and which have passed through the connection 127. In both FIGS. 12A and 12B the fluids can be pumped and/or vacuumed from one location to another and the fluid may be gas or liquid.

FIG. 13 shows a method 130 according to the present invention in which a thing 131 is tracked in a wellbore W as the thing 131 moves in a tubular T. The thing 131 has one or more McNano devices 138 which are sensed by apparatuses S. A signal from a particular apparatus S provides an indication of the location of the thing 131 within the tubular T. The apparatuses S in FIGS. 12A-13 can be used with any control system or computer or communication system disclosed herein or as disclosed in any patent or patent application referred to herein (and this is true for any apparatus S disclosed herein in any embodiment hereof).

Figure 14:
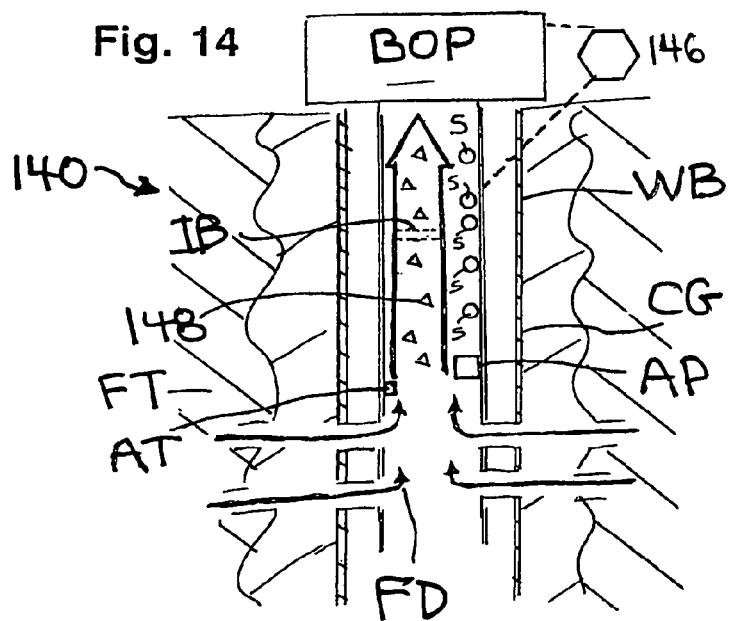
FIG. 14 is a schematic view of a system according to the present invention.
Figure 15:
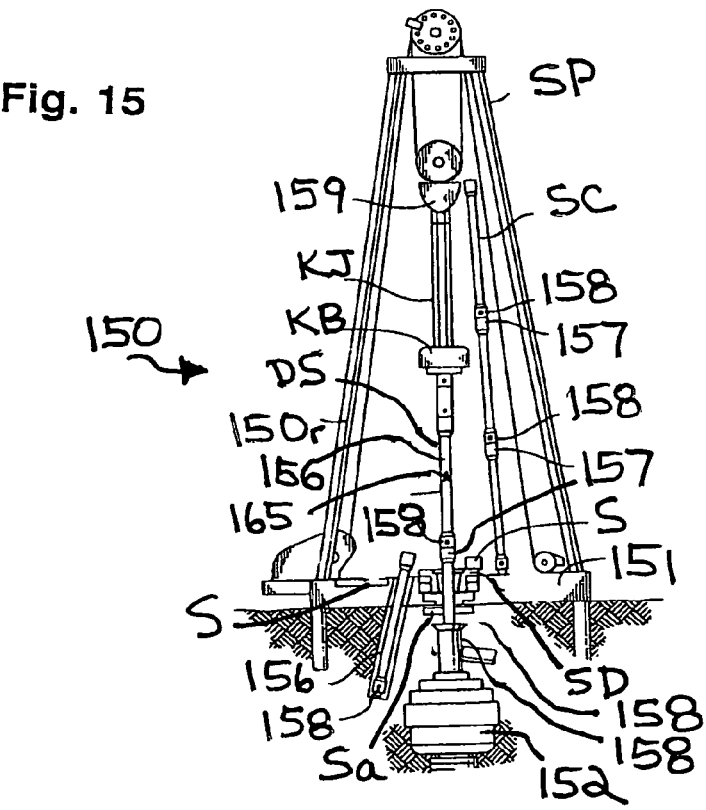
FIG. 15 is a schematic view of a system according to the present invention.

FIG. 14 shows a method 140 according to the present invention in which fluid FD from a formation FT flows through a cemented casing CG upwardly in a wellbore WB. In or on the casing CG, either therein or at the surface or just below the surface, including, but not limited to as shown in FIGS. 2, 5 and 15, is a blowout preventer apparatus BOP (shown schematically, indicates any known blowout preventer used in any tubular or wellbore). Optionally, an internal blowout preventer IB is in a tubular and is activated according to the present invention. Although the fluid flow is shown from a formation, it is to be understood that the present invention applies to the activation of any blowout preventer or internal blowout preventer in any situation or environment used with systems and McNano devices according to the present invention.

An apparatus AP senses and analyses the flow of the fluid FD and, in the event an increase in flow is indicated that corresponds to or possibly corresponds to a "kick" that could result in a blowout, the apparatus AP releases, or controls another apparatus AT that releases, McNano device(s) 148 into the fluid FD. Apparatuses S monitor the McNano device(s) 148 and their flow rate. If that rate indicates or increases to indicate that the fluid FD is a kick or will result in activation of the blowout preventer BOP, the apparatuses S communicate with a control system 146 which is in communication directly or indirectly (e.g., via other rig control and/or communication systems) with the blowout preventer BOP (or with systems that control the BOP) and which then activates the blowout preventer BOP, in certain cases, relatively sooner than if the kick was allowed to approach and/or contact the blowout preventer BOP or if parameters near or adjacent the BOP were measured and/or sensed to provide an indication that a kick was present and then the BOP was activated. The apparatuses S can also provide an indication of the location of the kick as it moves up in a tubular.

The advance warning provided by monitoring the fluid with the McNano devices 148 as the fluid FD moves up in the wellbore can also include alarms and warnings for personnel, e.g. relatively long before the kick approaches the BOP, and provide time for evacuation, for shutting down power sources and critical systems, and for closing off conduits to flow of various fluids on a rig. McNano device(s) with corresponding apparatuses S may be used to ascertain typical indicators of a kick such as, but not limited to, sudden change in drilling rate; change in surface fluid rate; and change in pump pressure— with McNano device(s) located for sensing parameters related to these indicators.

It is within the scope of the present invention to replace known relatively large energizable identification devices (e.g., but not limited to, those in U.S. Pat. No. 7,484,625 and in the references cited in this patent) with a McNano device according to the present invention (and this applies to all the energizable identification devices shown or described in U.S. Pat. No. 7,484,625). FIG. 15 shows a system 150 according to the present invention with a rig 150*r* according to the present invention which has in a rig floor 151 an apparatus S (shown schematically) for reading and/or energizing one or more McNano devices 165 in a drill pipe 156 which is to be used in drilling a wellbore. The drill pipe 156 may be connected with a tool joint 157 to other similar pieces of drill pipe in a drill string DS.

The drill string DS includes a plurality of drill pipes coupled by a plurality of tool joints and extends through a rotary table 158, and into a wellbore through a bell nipple 153 mounted on top of a blowout preventer stack 152. A McNano device 158 is provided on one or more drilling components, or the drill pipe. An apparatus Sa (like any apparatus S herein) with an antenna and a signal generator is positioned proximate to a McNano device, for example just below rotary table 158, and can establish a communications link with a McNano device to energize it, interrogate it, and/or to convey information relating to the equipment or drill pipe.

The system 150 includes the rig 150*r* with supports SP, a swivel 159, which supports the drill string, a kelly joint KJ, a kelly drive bushing KB, and a spider SD with an apparatus S. Additional drill string components SC, which are illustrated in FI in a racked position, may be coupled to drill pipe and inserted into the well bore, forming a portion of the drill string. One or more of drill string components may also include a McNano device. Although FIG. 15 illustrates a rotary rig, it is within the scope of the present invention for McNano devices and the related apparatuses to be used with top drive rigs and coiled tubing systems.

Figure 16:
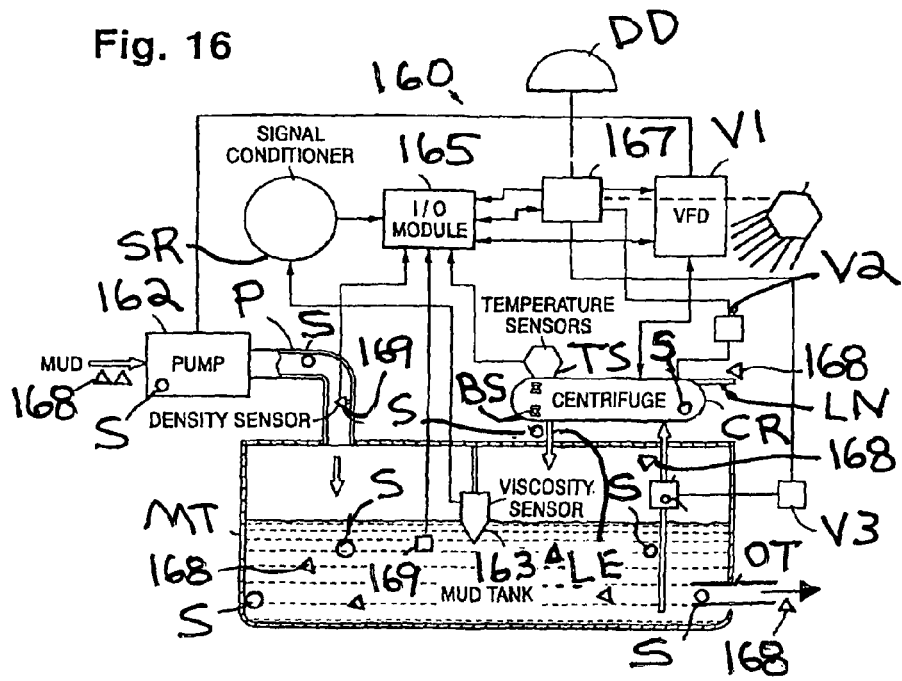
FIG. 16 is a schematic view of a system according to the present invention.

The present invention presents improvements to the systems disclosed in U.S. Pat. No. 7,540,838 which is incorporated fully herein for all purposes. As shown in FIG. 16 a system 160 according to the present invention has a pump 162 that pumps drilling mud through a pipe P into a mud tank MT. A viscosity sensor 163 senses the viscosity of the mud in the tank; a density sensor 169 senses the density of the mud in the pipe; and, optionally, a density sensor 169 senses the density of mud in the tank. The density sensor can be outside the pipe or in tie mud in the tank. A centrifuge CR (which can be any suitable known centrifuge) receives mud pumped by a pump 164 from the mud tank MT and processes it to remove selected solids, thereby controlling and/or changing the viscosity of the mud. Selected solids are discharged from the centrifuge in a line LN and the processed mud, with desirable solids therein, is reintroduced into the mud tank via a line LE. The pump 164 may run continuously. Optionally, fluid exits the tank MT through an outlet OT.

A computer system 167 controls an I/O module 165 and a variable frequency drives ("VFD") V1, V2, and V3. VFD V1 controls bowl speed of the centrifuge CR. VFD V2 controls the screw conveyor of the centrifuge and VFD V3 controls the feed pump 164. The system 167 computes a desired pump speed (pumping rate). A signal conditioner SR controls the viscosity sensor 163 and provides power to it. Temperature sensors TS monitor the temperature of bearings BS of a centrifuge drive system and send signals indicative of measured temperatures to the Input/Output module 165. The functions of the I/O module include sending data from the sensors to the system 167 and sending outputs from the system 167 to the VFD V1. The signal conditioner SR sends signals to the I/O module 165 indicative of viscosity values measured by the viscosity sensor 163. The density sensor(s) sends signals indicative of measured mud densities to the I/O module. The I/O module provides density measurements to the computer system. The I/O module provides command signals from the system 167 to the variable frequency drive V1. As desired, one or more agitators may be used in the tank MT.

Continuous density measurements made by the density sensor(s) are used by the computer system 167 to determine a desired value for a mud viscosity set point (e.g. using known equations or a look-up table). The computer system 167 compares actual viscosity measurements from the viscosity sensor 163 (processed by the signal conditioner SR) to the determined desired value and then the computer system 167 calculates the difference between the predetermined set point and a current actual viscosity value. Following this calculation, the computer system 167 changes the operational parameters of the VFDs to run a bowl and/or conveyor of the centrifuge CR faster or slower or to control pump speed. The computer system 167, which can run periodically or continuously, provides output(s) to a display device DD (e.g. a monitor, screen, panel, laptop, handheld or desktop computer, etc., remote and/or on site).

It is within the scope of the present invention to provide McNano devices in the various fluid streams and apparatuses of the system 160, as indicated by the McNano devices 168 shown schematically in FIG. 16 (devices not to scale). AS described above for other systems according to the present invention, these devices can be used to monitor and track the flow the fluid through the system and fluid flow to and from the centrifuge CR and through the system pumps.

It is also within the scope of the present invention for any of the McNano devices 168 to be used as a sensor to sense any parameter or level that McNano devices are capable of sensing, including, but not limited to, temperature, chemistry, pH, and pressure. Apparatuses S placed appropriately in the system receive information from the devices 168 and transmit it to a control system 166 which in turn conveys it to the system 167, or the apparatuses S are in direct communication with the system 167. The system 167 can receive and process information from the devices 168 to monitor fluid flow, to control the centrifuge, to monitor centrifuge operation and efficiency, and to control fluid flow through the conduits and lines of the system.

In any tank or flow conduit or apparatus of the system 160, a McNano device or devices may be used to selectively add or introduce material to what is present in the tank, flow conduit, or apparatus; e.g., but not limited to, adding to drilling fluid or mud; e.g., but not limited to, adding drilling fluid additives; and e.g., but not limited to, materials to change viscosity or density. An apparatus S can activate a McNano device which carries such material to, when desired, release the material. This is true for McNano device(s) in any fluid and any flow system and any drilling mud system disclosed herein in which it is desired to selectively introduce additional material to a fluid.

Figures 17A, 17B:
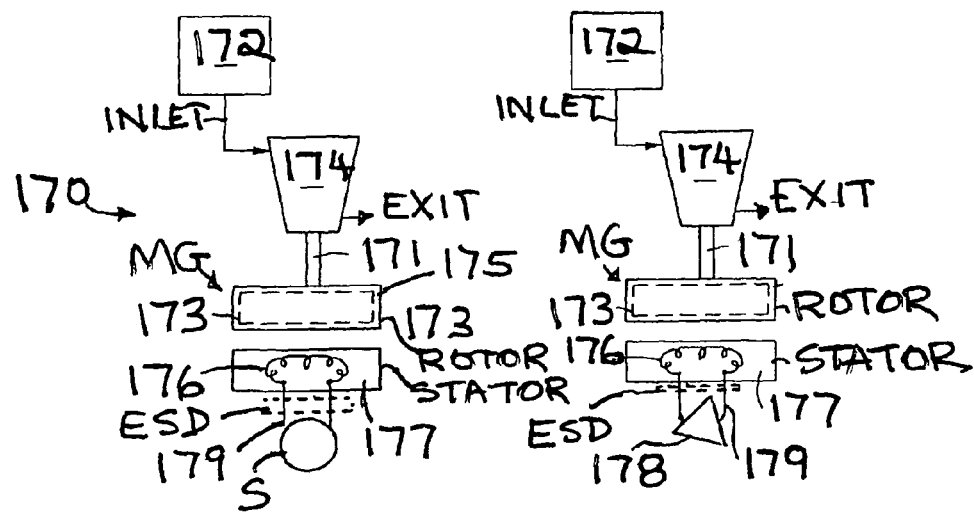
FIGS. 17A and 17B are schematic views of a system according to the present invention.

It is within the scope of the present invention to employ any known power supply or power source for powering an apparatus S or a McNano device. Known power supplies include batteries, voltaic cells, wireline transmission systems, and downhole motors; including, but not limited to, those disclosed in and those in references listed in U.S. Pat. Nos. 7,834,777; 6,554,074; 6,745,844 and 6,672,409. FIGS. 17A and 17B illustrate systems according to the present invention using a power supply as shown in U.S. Pat. No. 7,834,777.

As shown in FIG. 17A, a system 170 according to the present invention has a microgenerator MG in communication with a motive gas source 172. The microgenerator MG further has a rotor that is in electromagnetic communication with a stator, wherein the electromagnetic communication is capable of producing an electrical current for powering an apparatus S0. The microgenerator MG has a rotational activation system, e.g., but not limited to, a turbine 174 mechanically connected to the rotor via a shaft 171. The rotor 22 may have a disc like configuration wherein the diameter of the disc exceeds its thickness. The rotor is mechanically affixed to the output of the turbine 174 via the output shaft 171 and rotation of the turbine 174 correspondingly causes rotation of the rotor.

The turbine 174 is powered by the motive source 172 in which pressurized gas is stored. Pressurized gas is delivered to the turbine 174 from the motive source 172 via an inlet line ("INLET"). An exit line ("EXIT") is provided on the outlet side of the turbine 174. The pressurized fluid can be either pressurized gas, high-pressure liquid where the high-pressure liquid can be delivered through the turbine either in liquid form, or can be vaporized in the inlet line for powering the turbine 174. Optionally, the fluids stored within the motive fluid source 172 can be a mixture of gas and liquid. The motive fluid source 172 can be a combustion chamber wherein the exhaust gases from the combustion is fed to the turbine 174 via the inlet line for rotation of the turbine. The turbine energy source includes pressurized gas source piped from surface or another remote location in the wellbore, or generated in-situ via chemical reaction, etc.

Examples of a microgenerator powered by combustive gases can be found in U.S. Pat. No. 6,392,313 and in U.S. Patent Application Publication No. US 2004/0079301 the entire disclosures of which (as is true of any patent and application referred to herein) are incorporated for reference herein.

The rotor includes a magnet 173 housed within an outer casing 175. Alternatively however, the entire rotor may be comprised of a magnetic material. As shown, the magnet 173 is a permanent magnet, however the magnet may also be an electrostatic magnet or an electrical magnet. Additionally, the rotor may be made entirely of a magnet without the outer casing. As shown, the stator has at least one coil 176 disposed within a housing 177. The stator in one aspect is sufficiently proximate to the rotor such that it lies within the magnetic field produced by the magnet 173. Additionally, the stator in one aspect is substantially coaxial with the rotor. Although the stator includes a single coil 26, it may include additional coils, wherein each coil will operate at a different phase from the other coils. It is well within the scope of those skilled in the art to properly position the coil(s) of the stator within the magnetic field of the magnet 173 and in the proper orientation for the production of electrical power.

Leads 179 are connected to the ends of the coils thereby providing electrical communication from the coils) to the apparatus S. In operation, as the turbine 174 is powered by the motive fluid source 172 its resulting rotation thereby causes rotation of the rotor. Due to the presence of the magnet 173 within the rotor, an electrical current will be induced within the coil(s). Optionally, the combination of the coil disposed within the stator and in proximity of the magnet 173, the resulting combination can act as an alternator for producing electrical current. The induced electrical current can then be delivered to the apparatus S via the leads 179. The coil 176 and the leads 179 are made of an electrically conducting material, and can be of the same or different materials. Optionally, the generated power may be stored in an electrical energy storage device ("ESD") for use by the apparatus S. The apparatus S may be used to energize a McNano device.

As shown in FIG. 17B, the system 170 may be used to power a McNano device 178 directly (like numerals and labels indicate like parts in FIGS. 17A and 17B).

FIG. 18 shows a system 180 according to the present invention for conveying and using information obtained from apparatuses S and McNano devices 188 used in systems according to the present invention. It is to be understood that the system 180 is described by way of example only of one system for communicating with systems according to the present invention and that any suitable known communication system used in rig operations and wellbore operations may be employed. A system like the system 180 in some aspects is disclosed in U.S. Pat. No. 6,152,246.

A local area network LAN includes one or a plurality of personal computer work stations 181 that are interconnected by a suitable network. A server 183 is connected to receive input from apparatus S (which may also be apparatuses S). The server 183 is adapted to receive information from the apparatus or apparatuses S at a desired rate, e.g times per second or times per seconds. The information from the apparatuses S is stored in a database 187. Each personal computer work station 181 may access database 187 to obtain a configurable real time display of information stored in the data base 187.

Optionally, the information in the database 187 of the server 183 may be accessed remotely via a network NT, e.g. but not limited to, the internet. An entity or person 189 may, via the network NT, access the information in the database 187 (e.g., but not limited to, by a cellphone, netbook, or laptop computer or similar device) and, in one particular aspect, may control an apparatus S and/or a McNano device 188 via the network NT. Also, such control may be exercised via a computer 181.

As shown in FIG. 19A, a McNano device 190 according to the present invention for use in operations (rig operations, wellbore operations) may have a body 191 made of a first material and a part (or parts) 192 made of a second material. The first material 191 has a first density different from a second density which is the density of the second material of the part(s) 192. In one aspect, either material is used to increase the buoyancy of the McNano device 190, e.g., but not limited to, to facilitate the ability of the McNano device to combine with a fluid used in operations, to facilitate the introduction of the McNano device into a flow stream or into or through an apparatus or conduit, and/or to facilitate the ability of the McNano device to flow with a fluid.

As shown in FIG. 19B, a McNano device 193 according to the present invention for use in operations (rig operations, wellbore operations) may have a body 194 made of a first material and a less dense material 195 within the body 194 and/or a less dense material 196 on the body 196. The material 195 and/or the material 196 may be used to adjust the density of the McNano device 193 and/or to increase the buoyancy of the McNano device 193, e.g, but not limited to, to facilitate the ability of the McNano device to combine with a fluid used in operations, to facilitate the introduction of the McNano device into a flow stream or into or through an apparatus or conduit, and/or to facilitate the ability of the McNano device to flow with a fluid.

It is within the scope of the present invention to hold a McNano device at a given location, e.g, in a conduit, in an apparatus, in a flow path, or in a device, and to then selectively release it to perform a desired function. It is within the scope of the present invention to selectively stop a moving McNano device at a desired location in a conduit, etc. As shown in FIG. 20, a McNano device 208 with magnetically attractive material 209 therein and/or thereon is held stationary within a member 200 by a magnet apparatus 201 (e.g., but not limited to, any magnet, electromagnet, or electromagnet device or apparatus). Removal of a magnet 201 or cessation of power to an electromagnet 201 results in release of the McNano device 208.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. The inventor may rely on the Doctrine of Equivalents to determine and assess the scope of the invention and of the claims that follow as they may pertain to apparatus and/or methods not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The invention claimed is:

1. A method for an operation, the operation comprising a wellbore operation, the method comprising
    sensing with sensor apparatus in the wellbore the flow of fluid in a wellbore stream flowing up toward a blowout preventer, the sensor apparatus below the blowout preventer,
    upon sensing a fluid flow increase of the wellbore stream with the sensor apparatus, releasing at least one McNano device into the wellbore stream,
    with monitor apparatus below the blowout preventer, monitoring the at least one Mcnano device to monitor the fluid flow of the wellbore stream,
    upon the monitor apparatus producing a signal indicating a fluid flow rate increasing to a fluid flow sufficient to effect activation of the blowout preventer, activating the blowout preventer before said fluid flow contacts the blowout preventer.

2. The method of claim 1 further comprising
    controlling the sensor apparatus, the monitor apparatus, and the blowout preventer with a control system.

3. The method of claim 2 wherein the control system receives the signal, the method further comprising
    with the control system, following receipt of the signal, shutting down systems used in the wellbore operation.

4. The method of claim 2 wherein the control system receives the signal, the method further comprising
    with the control system, following receipt of the signal, closing off flow conduits used in the wellbore operation.

5. The method of claim 2 wherein the control system receives the signal, the method further comprising
   with the control system, following receipt of the signal, providing alarms for personnel involved in the wellbore operation.

6. The method of claim 2 wherein the control system receives the signal, the method further comprising
   with the control system, following receipt of the signal, shutting down power sources used in the wellbore operation.

7. The method of claim 2 wherein the control system receives the signal, the method further comprising
   providing with the monitor apparatus a location signal indicative of a location of the fluid flow rate increasing to indicate a fluid flow sufficient to effect activation of the blowout preventer.

8. The method of claim 1 wherein the blowout preventer is an internal blowout preventer.

9. A method for an operation, the operation comprising a wellbore operation, the method comprising
   flowing a stream with respect to an apparatus useful in the operation, the apparatus comprising an activatable apparatus, the activatable apparatus having a sensor apparatus,
   the stream containing at least one McNano device, and
   upon sensing the at least one McNano device with the sensor apparatus, activating the activatable apparatus;
   wherein the activatable apparatus is a blowout preventer, the stream is a wellbore stream of fluid flowing up toward the blowout preventer, the sensor apparatus is below the blowout preventer, and wherein monitor apparatus for monitoring the wellbore stream is below the blowout preventer, the method further comprising
   sensing with the sensor apparatus the flow of the wellbore stream below and toward the blowout preventer,
   upon sensing a fluid flow increase of the wellbore stream with the sensor apparatus, releasing at least one McNano device into the wellbore stream, said at least one McNano device comprising a released McNano device,
   with the monitor apparatus, monitoring the released McNano device to monitor fluid flow of the wellbore stream,
   upon the monitor apparatus indicating a fluid flow rate of the wellbore stream increasing to a fluid flow sufficient to effect activation of the blowout preventer if said fluid flow rate were detected by other apparatus, activating the blowout preventer.

10. The method of claim 9 wherein the at least one McNano device is a plurality of McNano devices.

11. The method of claim 9 further comprising activating the activatable apparatus with the sensor apparatus.

12. The method of claim 9 wherein the wellbore operation is related to a wellbore which extends from an earth surface down into the earth, the method further comprising activating the activatable apparatus with a surface apparatus at the surface.

13. The method of claim 9 wherein the wellbore operation is related to a wellbore which extends from an earth surface down into the earth, the method further comprising activating the activatable apparatus with a downhole apparatus in the wellbore.

14. The method of claim 9 wherein the blowout preventer is an internal blowout preventer.

* * * * *